US010493817B2

(12) United States Patent
Shimoyama et al.

(10) Patent No.: US 10,493,817 B2
(45) Date of Patent: Dec. 3, 2019

(54) AIR CONDITIONING UNIT

(71) Applicant: DENSO CORPORATION, Kariya, Aichi-pref. (JP)

(72) Inventors: Yohei Shimoyama, Kariya (JP); Shuhei Yonemitsu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 686 days.

(21) Appl. No.: 15/104,252

(22) PCT Filed: Nov. 28, 2014

(86) PCT No.: PCT/JP2014/005955
§ 371 (c)(1),
(2) Date: Jun. 14, 2016

(87) PCT Pub. No.: WO2015/092983
PCT Pub. Date: Jun. 25, 2015

(65) Prior Publication Data
US 2016/0311291 A1 Oct. 27, 2016

(30) Foreign Application Priority Data

Dec. 17, 2013 (JP) ................................. 2013-260304

(51) Int. Cl.
*B60H 1/12* (2006.01)
*B60H 1/00* (2006.01)

(52) U.S. Cl.
CPC ..... *B60H 1/00678* (2013.01); *B60H 1/00471* (2013.01); *B60H 1/00514* (2013.01);
(Continued)

(58) Field of Classification Search
CPC ............ B60H 1/00678; B60H 1/00471; B60H 1/00514; B60H 1/12; B60H 1/00
(Continued)

(56) References Cited

U.S. PATENT DOCUMENTS 5,987,905 A * 11/1999 Nonoyama ........ B60H 1/00507
165/249
6,450,246 B1 * 9/2002 Kurokawa ......... B60H 1/00692
165/42

(Continued)

FOREIGN PATENT DOCUMENTS

JP H04083978 A 3/1992
JP H09325396 A 12/1997
(Continued)

*Primary Examiner* — Steven B McAllister
*Assistant Examiner* — Samantha A Probst
(74) *Attorney, Agent, or Firm* — Harness, Dickey & Pierce, P.L.C.

(57) ABSTRACT

A partition seal portion of a second rotary door is located between an outer door portion and a partition rib. The partition seal member is pressed against a rib tip portion in a door radial direction and moves slidably while being in contact with the rib tip portion in conjunction with a rotation of the second rotary door. Accordingly, an increase of a width in a door axial direction required for a sealing configuration can be suppressed. Therefore, a seal between a side face outlet and a center face outlet can be secured while being preventing a length of a face outlet in the door axial direction from being short.

18 Claims, 14 Drawing Sheets

(52) U.S. Cl.
CPC ..... *B60H 1/12* (2013.01); *B60H 2001/00714* (2013.01); *B60H 2001/00728* (2013.01)

(58) Field of Classification Search
USPC .......................................................... 454/160
See application file for complete search history.

(56) References Cited

U.S. PATENT DOCUMENTS

| | | | | |
|---|---|---|---|---|
| 6,568,468 | B1* | 5/2003 | Uemura | B60H 1/00064 165/103 |
| 8,302,674 | B2* | 11/2012 | Kim | B60H 1/00064 165/119 |
| 8,403,735 | B2* | 3/2013 | Onda | B60H 1/00685 454/143 |
| 8,511,371 | B2* | 8/2013 | Onda | B60H 1/00685 165/202 |
| 9,381,788 | B2* | 7/2016 | Han | B60H 1/00692 |
| 2003/0143941 | A1* | 7/2003 | Fujiwara | B60H 1/00685 454/139 |
| 2004/0093884 | A1 | 5/2004 | Seki et al. | |
| 2004/0093885 | A1* | 5/2004 | Ito | B60H 1/00028 62/244 |
| 2004/0231834 | A1* | 11/2004 | Shibata | B60H 1/00064 165/204 |
| 2007/0181295 | A1* | 8/2007 | Masatsugu | B60H 1/00678 165/202 |
| 2007/0266721 | A1 | 11/2007 | Seki et al. | |
| 2009/0093207 | A1* | 4/2009 | Han | B60H 1/00678 454/155 |
| 2010/0144263 | A1* | 6/2010 | Han | B60H 1/00678 454/155 |
| 2016/0311291 | A1* | 10/2016 | Shimoyama | B60H 1/00678 |

FOREIGN PATENT DOCUMENTS

| | | |
|---|---|---|
| JP | H10166839 A | 6/1998 |
| JP | 2000043536 A | 2/2000 |
| JP | 2001158219 A | 6/2001 |
| JP | 2002341650 A | 11/2002 |
| JP | 2004098883 A | 4/2004 |
| JP | 2004155263 A | 6/2004 |
| JP | 2005214541 A | 8/2005 |
| JP | 3900925 B2 | 4/2007 |

* cited by examiner

AIR CONDITIONING UNIT

CROSS REFERENCE TO RELATED APPLICATIONS

This application is a U.S. National Phase Application under 35 U.S.C. 371 of International Application No. PCT/JP2014/005955 filed on Nov. 28, 2014 and published in Japanese as WO 2015/092983 A1 on Jun. 25, 2015. This application is based on and claims the benefit of priority from Japanese Patent Application No. 2013-260304 filed on Dec. 17, 2013. The entire disclosures of all of the above applications are incorporated herein by reference.

TECHNICAL FIELD

The present disclosure relates to an air conditioning unit in which air outlet is open or closed by a rotary door.

BACKGROUND ART

An air conditioning unit that has face outlets and a rotary door opening or closing the face outlets is conventionally known. Such an air conditioning unit is disclosed, for example, in Patent Literature 1 as a fifth embodiment.

The air conditioning unit of Patent Literature 1 has, as the face outlets, a center face outlet and two side face outlets that are provided on both sides of the center face outlet respectively. The rotary door has three door portions corresponding to the three face outlets respectively, and the three door portions are fixed integrally with a door rotary shaft of the rotary door.

Each of the three face outlets is open or closed in conjunction with a rotation of the rotary door. In the two side face outlets, an air passage is secured such that air blows slightly from the side face openings even when the rotary door is located at a closing position where the side face outlet is closed. Specifically, the door portion that opens or closes the side face outlet is configured by a flat door having no seal portion. On the other hand, the center face outlet is closed such that such an air passage is not secured and a leaking of air is restricted as much as possible when the rotary door is located at a closing position.

Therefore, the door portion opening or closing the center face outlet has a first seal portion that protrudes outward in a radial direction of the door rotary shaft to have a flange shape and a second seal portion that protrudes toward both sides in an axial direction of the door rotary shaft to have a flange shape. A seal pressing portion that has a facing surface that faces the first seal portion and the second seal portion is provided in a case. The center face outlet is fully closed by pressing the first seal portion and the second seal portion against the seal pressing portion of the case when the rotary door is positioned to be balanced in a lateral direction.

PRIOR ART LITERATURES

Patent Literature

Patent Literature 1: JP 2004-155263 A

SUMMARY OF INVENTION

According to the air conditioning unit of Patent Literature 1, a flow of air from the side face outlets to the center face outlet is required to be suppressed to restrict an air leaking from the center face outlet when the rotary door is located at a closing position. Accordingly, for example, a partition wall that extends inward in a boundary area between the center face outlet and the side face outlets is provided in the case. The seal pressing portion against which the second seal portion is pressed is provided to extend from the partition wall. Thus, the flow or air from the side face outlets to the center face outlet can be suppressed by providing the partition wall and by pressing the second seal portion against the seal pressing portion.

Then, the center face outlet is required to be open as large as possible to secure an enough air volume blowing from the center face outlet. However, the seal pressing portion against which the second seal portion is pressed protrudes toward an inner side of the center face outlet in the axial direction of the door rotary shaft, in other words, protrudes in a direction narrowing the center face outlet. Therefore, the seal pressing portion restricts a volume of air when the air is blown from the center face outlet.

The present disclosure addresses the above issues, and it is an objective of the present disclosure to provide an air conditioning unit with which a flow of air from one to the other of two air outlets can be suppressed sufficiently by sealing therebetween, and with which an air outlet can be prevented from narrowing in an axial direction of a door rotary shaft due to a sealing configuration.

An air conditioning unit of the present disclosure has a rotary door, a case, a first opening, a partition, and an air passage. The rotary door has a door rotary shaft and an outer door portion rotating integrally with the door rotary shaft at a position where a specified distance away outward from a center of the door rotary shaft in a radial direction. The case houses the rotary door. The first opening (i) is located in the case on an outer side of the outer door portion in the radial direction of the door rotary shaft, (ii) is open or closed by the rotary door, and (iii) blows air. The partition is provided in the case and partitions the first opening to form a first air outlet and a second air outlet that are arranged in an axial direction of the door rotary shaft. The air passage is formed in the case, and air flows toward the first opening in the air passage.

The partition has a partition rib that protrudes inward in the radial direction, and the partition rib has a rib tip portion that extends in a circumferential direction of the door rotary shaft. The rotary door (i) has a partition seal portion that is fixed to the outer door portion on an outer side of the outer door portion, (ii) has elasticity, and (iii) is located between the outer door portion and the partition rib. The partition seal portion is pressed against the rib tip portion in the radial direction and moves slidably with respect to the rib tip portion in conjunction with a rotation of the rotary door around the door rotary shaft.

According to the present disclosure, the rotary door has the partition seal portion that is fixed to the outer door portion on the outer side of the outer door portion and located between the outer door portion and the partition rib. The partition seal portion is pressed against the rib tip portion in the radial direction of the door rotary shaft and moves slidably with respect to the rib tip portion in conjunction with a rotation of the rotary door around the door rotary shaft. Therefore, it can be able to seal between the first air outlet and the second air outlet such that a flow of air from one to the other of the first air outlet and the second air outlet can be sufficiently suppressed. Furthermore, the partition rib protrudes inward in the radial direction of the door rotary shaft. Accordingly, both of the first air outlet and the second air outlet cannot interpose. Thus, the first air outlet or the second air outlet can be prevented from narrowing in the axial direction of the door rotary shaft due to a sealing configuration between the first air outlet and the second air outlet.

DESCRIPTION OF EMBODIMENTS

Embodiments of the present disclosure will be described hereafter referring to drawings. In the embodiments and modifications described later, a part that corresponds to or equivalents to a matter described in a preceding embodiment may be assigned with the same reference number.

First Embodiment

Figure 1:
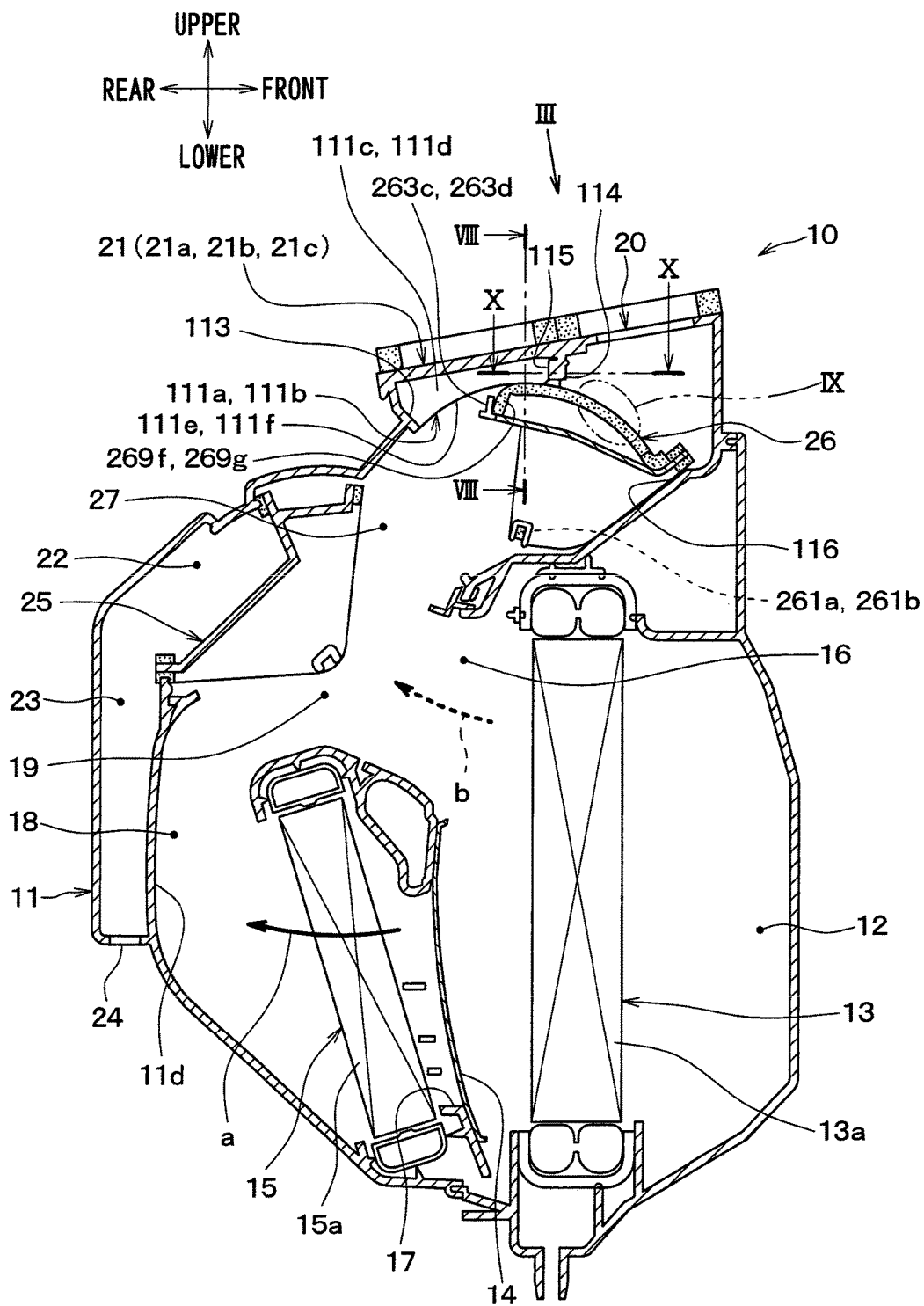
FIG. 1 is a longitudinal sectional view illustrating an air conditioning unit 10 according to a first embodiment and is a view illustrating the air conditioning unit 10 in a face mode.
Figure 2:
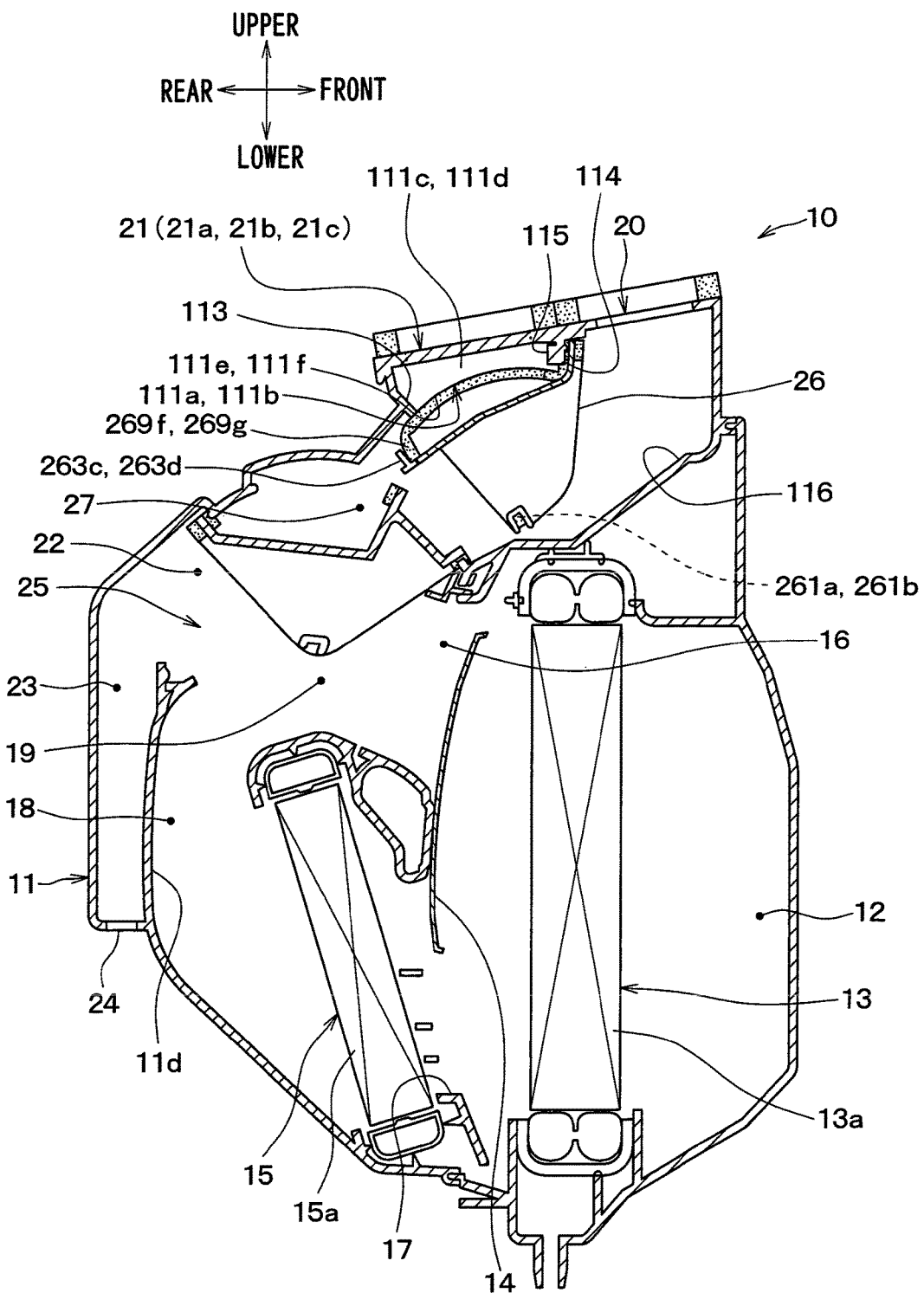
FIG. 2 is a longitudinal sectional view illustrating the air conditioning unit 10 of FIG. 1 and is a view illustrating the air conditioning unit 10 in a foot mode.

FIG. 1 and FIG. 2 are a longitudinal sectional view illustrating an air conditioning unit 10 housing a heat exchanger. The air conditioning unit 10 is included in a compartment unit that configures a part of a vehicle air conditioner having a refrigerant cycle configured by devices such as a compressor and a condenser disposed in an engine room. Specifically, FIG. 1 and FIG. 2 are a cross-sectional view taken along a line I-I shown in FIG. 3 described after. FIG. 1 is a view illustrating the air conditioning unit 10 in a face mode, and FIG. 2 is a view illustrating the air conditioning unit 10 in a foot mode.

The air conditioning unit 10 is arranged in the generally central part in a lateral direction of a vehicle, in other words, in a width direction of the vehicle inside an instrument panel that located in a front area in a vehicle compartment and is not shown. Arrows showing upper, lower, front and rear respectively in FIG. 1 and FIG. 1 and arrows showing left and right respectively in FIG. 3 indicate directions in a condition of being mounted in the vehicle. The compartment unit of the vehicle air conditioner is divided broadly into the air conditioning unit 10 located in the central part and a blower unit that is arranged to be offset toward a passenger seat side inside the instrument panel and is not shown.

The blower unit has an inside-air/outside-air switching case that selectively introduce outside air, which is air outside of the vehicle compartment, or inside air, which is air in the vehicle compartment, and a centrifugal blower that ventilates the air introduced into the inside-air/outside-air switching case as being well-known. Air blown by the blower unit flows into an air inflow space 12 defined in a foremost area in a case 11 of the air conditioning unit 10 shown in FIG. 1.

The air conditioning unit 10 has the case 11, an evaporator 13, an air mix door 14, a heater core 15, a first rotary door 25 and a second rotary door 26. The case 11 configures an air passage in which air flows toward an inside of the vehicle compartment and houses the evaporator 13, the air mix door 14, the heater core 15, the first rotary door 25, and the second rotary door 26.

The case 11 is made of resin such as polypropylene that has a certain level of elasticity and great mechanical strength. The case 11 is formed specifically in a manner that divided cases are molded separately, and the divided cases are coupled integrally, for a reason of assembly of air conditioning devices into the case 11.

The evaporator 13 functioning as a cooling heat exchanger is arranged longitudinally in the upper-lower direction on a rear side of the air inflow space 12 inside of the case 11 of the air conditioning unit 10. That is, the evaporator 13 is arranged such that a longitudinal direction of the evaporator 13 is parallel with the upper-lower direction. The evaporator 13 has a core portion 13a, and an air inlet surface and an air outlet surface of the core portion 13a extend in the upper-lower direction.

Therefore, air blown from the blower unit flows into the air inflow space 12, and subsequently flows out of the air inflow space 12 to pass the core portion 13a of the evaporator 13 from a front side to a rear side. As being well-known, a low-pressure refrigerant of which pressure is reduced by a decompressor such as an expansion valve in the refrigeration cycle of the vehicle air conditioner is flows in the evaporator 13. The air is cooled when the low-pressure refrigerant absorbs heat from the air and evaporates.

The air mix door 14 and the heater core 15 that is a hot-water type and functions as a heating heat exchanger are located on a rear side of the evaporator 13, in other words, on a downstream side of the evaporator 13 in an air flow direction. The air mix door 14 is configured by a film door that slides by an actuation mechanism that is not shown.

The heater core 15 heats air using, as a heat source, hot water that is an engine cooling water for a vehicle engine. The heater core 15 has a core portion 15a. The heater core 15 is arranged longitudinally such that the air inlet surface and the air outlet surface of the core portion 15a extend generally in the upper-lower direction.

On the other hand, a cool air passage 16 is formed in parallel with respect to a flow of air flowing in the heater core 15. Cool air that is air after passing through the evaporator 13 flows in the cool air passage 16 while bypassing the heater core 15 as shown by a dashed arrow b in FIG. 1.

The air mix door 14 is located between the evaporator 13 and the heater core 15. The air mix door 14 slides in the upper-lower direction of the vehicle and opens or closes an inlet path 17 that is an inlet to the heater core 15 and the cool air passage 16. Accordingly, a temperature of air blown into the vehicle compartment can be adjusted by adjusting a mixing ratio between warm air that passes through the inlet path 17, is heated in the heater core 15, and flows as shown by an arrow a and cool air that passes through the cool air passage 16 and flows as shown by an arrow b.

The case 11 has a warm-air guide wall 11d that is located a specified distance away from the heater core 15 on a rear side of the heater core 15. A warm air passage 18 is formed between the warm-air guide wall 11d and the heater core 15. Warm air after passing through the heater core 15 is guided by the warm-air guide wall 11d and flows upward in the warm air passage 18.

Warm air flowing in the warm air passage 18 collides with cool air flowing in the cool air passage 16 as shown by the arrow b. An air mixing portion 19 is formed in a portion in which the warm air collides with the cool air, that is, a joint portion of the cool air passage 16 and the warm air passage 18. Cool air from the cool air passage 16 and warm air from the warm air passage 18 are mixed in the air mixing portion 19 to be a conditioned air, and the conditioned air flows into a communication passage 27.

A defroster opening 20 is open in a front portion of an upper surface of the case 11, and a face opening 21 is open on a rear side of the defroster opening 20 in the upper surface of the case 11. The conditioned air passing through the communication passage 27 is blown from each of the face opening 21 as a first opening and the defroster opening 20 as a second opening. That is, the communication passage 27 is an air passage which is formed in the case 11, and in which the conditioned air flows from the air mixing portion 19 to the defroster opening 20 and the face opening 21. The defroster opening 20 and the face opening 21 are arranged on an outer side of the second rotary door 26 in a radial direction DRrd of door rotary shafts 261a, 261b (refer ro FIG. 4) and opened or closed by the second rotary door 26.

The defroster opening 20 blows the conditioned air from the air mixing portion 19 toward an inner surface of a front windshield of the vehicle. The defroster opening 20 is arranged to be adjacent to the face opening 21 in a circumferential direction DRcr of the door rotary shafts 261a, 261b (refer to FIG. 4) of the second rotary door 26.

Figure 3:
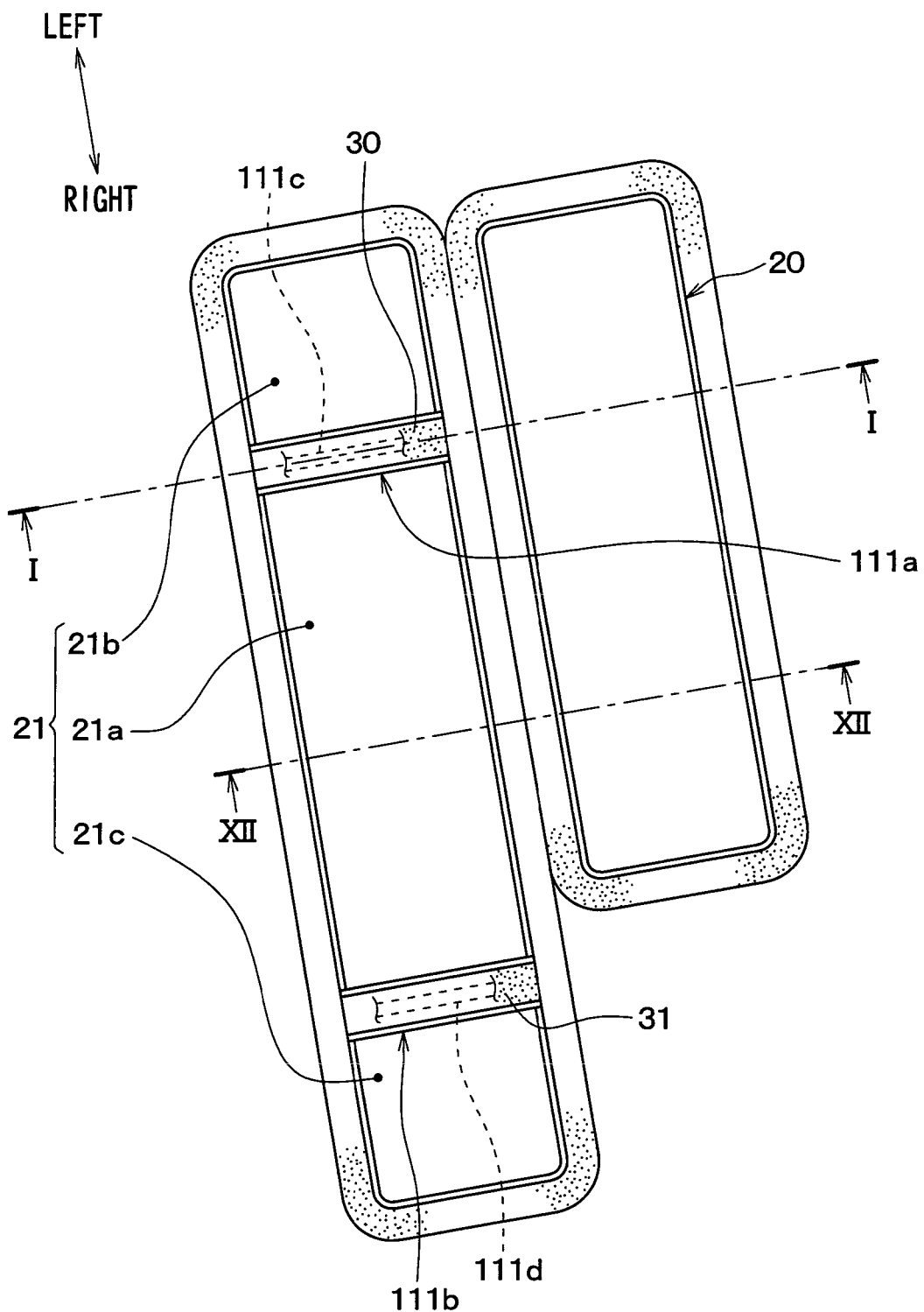
FIG. 3 is a view illustrating the air conditioning unit of FIG. 1 when viewed in a direction shown by an arrow III.

The face opening 21 is, as shown in FIG. 3, divided to form the center face outlet 21a and two side face outlets 21b, 21c by two partitions 111a, 111b (refer to FIG. 8) provided in the case 11. That is, the face opening 21 includes the center face outlet 21a as a first air outlet and the side face outlets 21b, 21c as a second air outlet. The three outlets 21a, 21b, 21c are arranged in the width direction of the vehicle, and the side face outlets 21b, 21c are respectively located on both sides of the center face outlet 21a in the lateral direction. FIG. 3 is a view illustrating the air conditioning unit of FIG. 1 when viewed in a direction shown by an arrow III. As shown in FIG. 3, the defroster opening 20 and the face opening 21 has a rectangular shape when viewed from an upper side. The partitions 111a, 111b are a part of the case 11. However, the partitions 111a, 111b may be formed integrally with peripheral portions, or may be formed separately from others.

The center face outlet 21a of the face opening 21 blows the conditioned air from the air mixing portion 19 toward an upper body of a passenger at a center area of the instrument panel of the vehicle in the lateral direction. The side face outlets 21b, 21c blows the conditioned air toward an upper body of the passenger on a window side or toward an inner surface of a side window of the vehicle at both end sides of the instrument panel of the vehicle in the lateral direction. The center face outlet 21a is called a center vent outlet, and the side face outlets 21b, 21c are called a side vent outlet.

As shown in FIG. 1, a foot opening 22 is located above the warm air passage 18 in the case 11. Accordingly, the foot opening 22 is located on a rear side of the face opening 21.

The foot opening 22 guides the conditioned air from the air mixing portion 19 to a foot outlet 24 through a foot blowing passage 23. The foot outlet 24 blows the conditioned air toward foot of the passenger in the vehicle compartment.

According to the present embodiment, a blowing mode switching mechanism has the first rotary door 25 and the second rotary door 26. The first rotary door 25 opens or closes the foot opening 22, and the second rotary door 26 opens or closes the defroster opening 20 and the center face outlet 21a. The communication passage 27 is formed to be adjacent to a front side of the foot opening 22 inside the case 11, and the first rotary door 25 also adjusts an opening degree of the communication passage 27.

The first rotary door 25 rotates between a foot closing position (refer to FIG. 1) where the first rotary door 25 closes the foot opening 22 and adjusts the opening degree of the communication passage 27 to be maximum and a foot opening position (refer to FIG. 2) where the first rotary door 25 adjusts an opening degree of the foot opening 22 to be maximum and closes the communication passage 27. However, the first rotary door 25 does not fully close the communication passage 27 even at the foot opening position, such that air slightly flows from the air mixing portion 19 to the communication passage 27. That is, the opening degree of the communication passage 27 becomes minimum when the first rotary door 25 is located at the foot opening position, and air slightly flows to the communication passage 27. The first rotary door 25 is also located, other than the foot closing position and the foot opening position, at a middle position between the foot closing position and the foot opening position.

The second rotary door 26 rotates to be selectively located between a first rotary position, as a defroster closing position, where the second rotary door 26 adjusts an opening degree of the center face outlet 21a to be maximum and closes the defroster opening 20 and a second rotary position, as a defroster opening position, where the second rotary door 26 closes the center face outlet 21a and adjusts an opening degree of the defroster opening 20 to be maximum. An opening degree of the side face outlets 21b, 21c becomes maximum when the second rotary door 26 is located at the defroster closing position and becomes minimum when the second rotary door 26 is located at the defroster opening position. FIG. 1 shows a condition where the second rotary door 26 is located at the defroster closing position, and FIG. 2 shows a condition where the second rotary door 26 is located at the defroster opening position.

Figure 4:
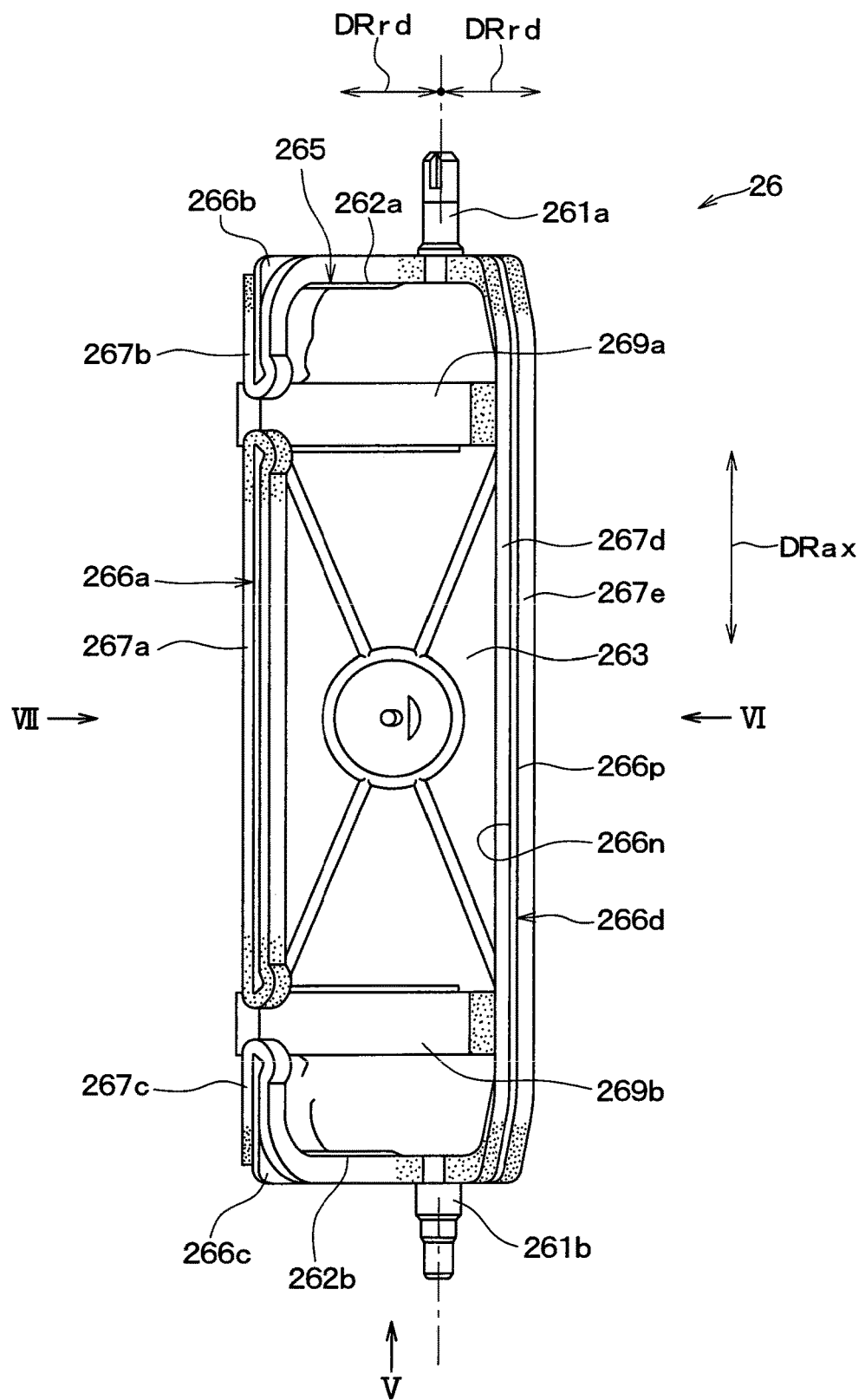
FIG. 4 is a front view illustrating a second rotary door 26 of the air conditioning unit 10 of FIG. 1.
Figure 5:
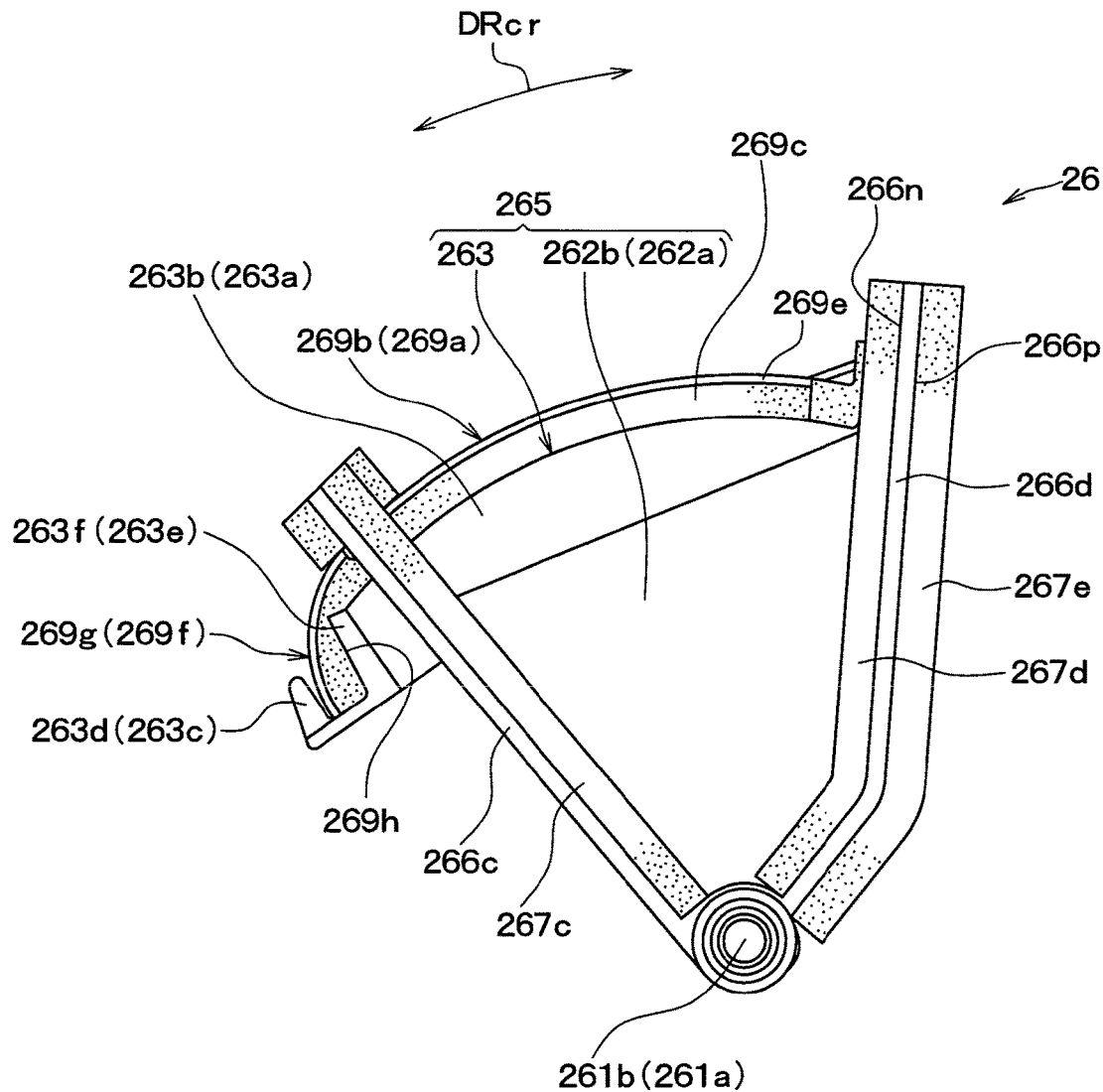
FIG. 5 is a view illustrating the second rotary door of FIG. 4 when viewed in a direction shown by an arrow V.
Figure 6:
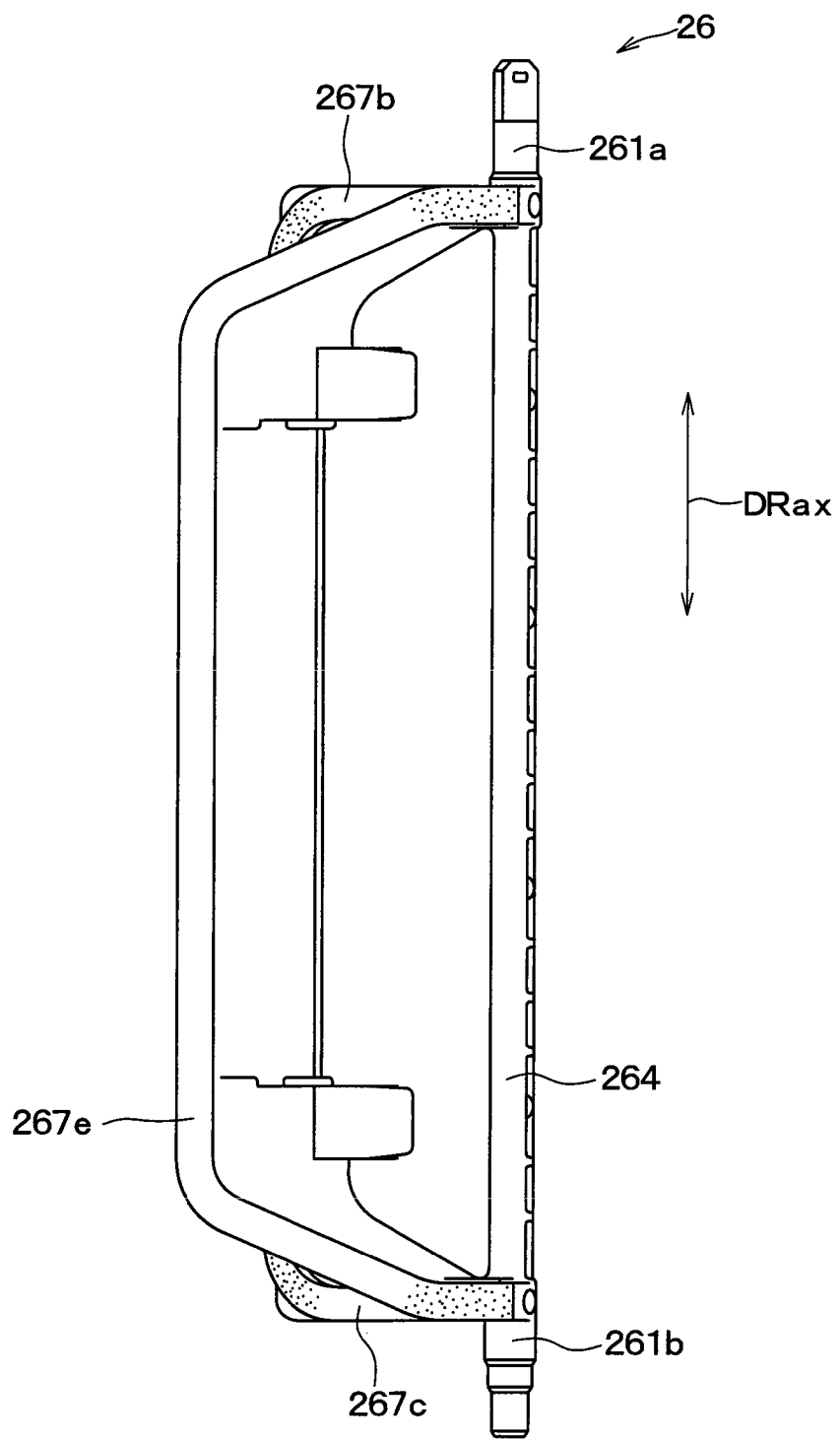
FIG. 6 is a view illustrating the second rotary door of FIG. 4 when viewed in a direction shown by an arrow VI.
Figure 7:
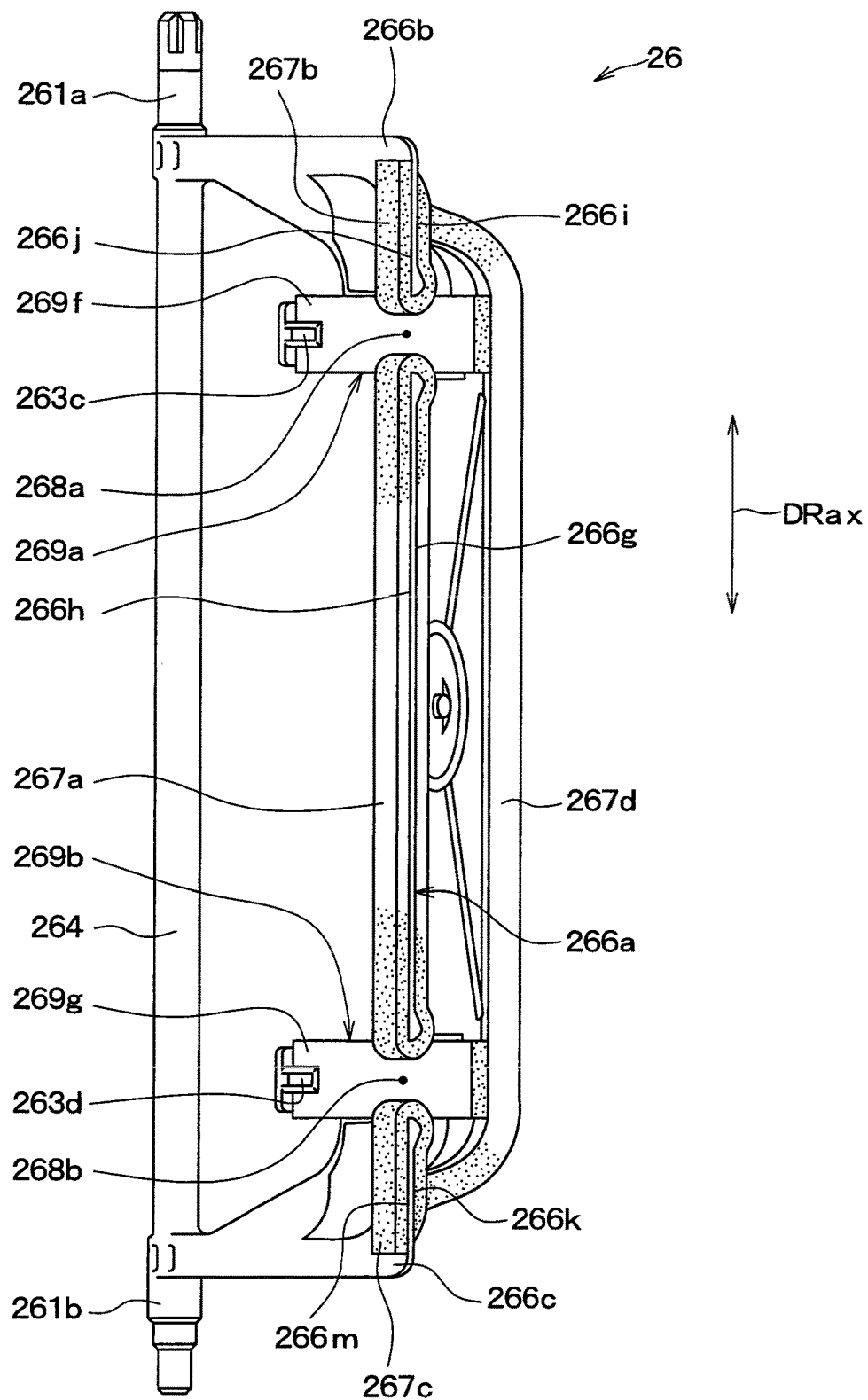
FIG. 7 is a view illustrating the second rotary door of FIG. 4 when viewed in a direction shown by an arrow VII.

A configuration of the second rotary door 26 will be described in detail referring FIGS. 4 through 7. FIGS. 4 through 7 are a projection view of the second rotary door 26. FIG. 4 is a front view illustrating the second rotary door 26. FIG. 5 is a view illustrating the second rotary door 26 of FIG. 4 when viewed in a direction shown by an arrow V. FIG. 6 is a view illustrating the second rotary door 26 of FIG. 4 when viewed in a direction shown by an arrow VI. FIG. 7 is a view illustrating the second rotary door of FIG. 4 when viewed in a direction shown by an arrow VII. The following description about the second rotary door 26 refers FIG. 4 and FIG. 5 mainly. The second rotary door 26 corresponds to a rotary door of the present disclosure. As shown in FIG. 4 and FIG. 5, an axial direction of the door rotary shafts 261a, 261b of the second rotary door 26 will be referred to as a door shaft direction DRax, the radial direction of the door rotary shafts 261a, 261b will be referred to as a door radial direction DRrd, and the circumferential direction of the door rotary shafts 261a, 261b will be referred to as a door circumferential direction DRcr. In FIG. 5, a portion that is visible when viewing the second rotary door 26 in a direction opposite to the direction shown by the arrow V of FIG. 4 is assigned a number with brackets. The door axial direction DRax coincides with the width direction of the vehicle.

As shown in FIG. 4 and FIG. 5, the second rotary door 26 has (i) the door rotary shafts 261a, 261b that are provided on both sides of the second rotary door 26 respectively to protrude in the width direction of the vehicle, (ii) side plates 262a, 262b configuring a side surface of the second rotary door 26, and (iii) an outer door portion 263. The door rotary shafts 261a, 261b, the side plates 262a, 262b, and the outer door portion 263 are integrally configures the second rotary door 26. For example, the door rotary shafts 261a, 261b, the side plates 262a, 262b, the outer door portion 263, and a connector middle shaft 264 (refer to FIG. 6) are integrally made of resin such as polypropylene.

The side plates 262a, 262b has a width in the door circumferential direction DRcr when viewed in the door axial direction DRax, and the width becomes smaller toward the door rotary shafts 261a, 261b. The door rotary shafts 261a, 261b respectively protrude outward on both sides in a left-right direction at a position where the width of the side plates 262a, 262b is smallest. The door rotary shafts 261a, 261b are supported rotatably by shaft holes 112a, 112b (refer to FIG. 8) that are respectively formed in side walls of the case 11 on both sides in the left-right direction. The connector middle shaft 264 (refer to FIG. 6) is interposed between the door rotary shaft 261a and the door rotary shaft 261b in the door axial direction DRax to be coaxially with each other. The door rotary shafts 261a, 261b are coupled with each other by the connector middle shaft 264.

Figure 8:
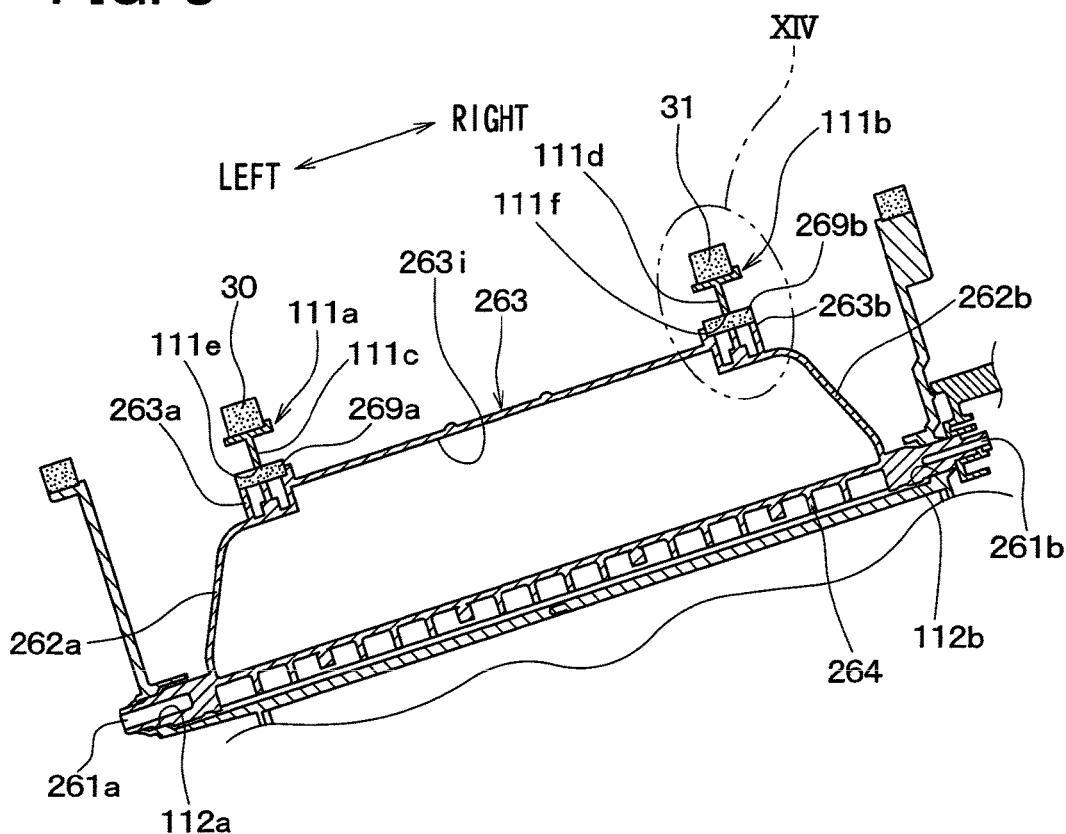
FIG. 8 is a cross-sectional view taken along a door radial direction DRrd and illustrating the second rotary door 26 and a face opening 21, in other words, a cross-sectional view taken along a line VIII-VIII shown in FIG. 1.

The side plates 262a, 262b and the outer door portion 263 form an inside space having a cap shape as shown in FIG. 8. The inside space is normally open inside the case 11. That is, the inside space communicates with the communication passage 27 in the case 11 (refer to FIG. 1). FIG. 8 is a cross-sectional view illustrating the second rotary door 26 and the face opening 21 taken along the door radial direction DRrd, that is, a cross-sectional view taken along a line VIII-VIII shown in FIG. 1.

As shown in FIG. 4 and FIG. 5, the outer door portion 263 expands in the door axial direction DRax and the door circumferential direction DRcr at a location where a specified distance away outward from a center of the door rotary shafts 261a, 261b in the door radial direction DRrd. The outer door portion 263 rotates together with the door rotary shafts 261a, 261b. A planar shape of the outer door portion 263 when viewed in the door radial direction DRrd is a rectangular shape, and a length of the outer door portion 263 in the width direction of the vehicle, in other words, in the door axial direction DRax is longer than a length of the outer door portion 263 in the front-rear direction.

A sealing configuration in the second rotary door 26 will be described hereafter. A door sealing configuration becomes the sealing configuration that seals basically by pressing a seal portion to reduce a force for operating a door.

The second rotary door 26 has a door base portion 265 that is configured by the side plates 262a, 262b and the outer door portion 263. The second rotary door 26 has a first flange 266a, a second flange 266b, a third flange 266c, and a fourth flange 266d, which have a flange shape, in a peripheral surface of the door base portion 265. The flanges 266a, 266b, 266c, 266d are formed integrally with each other to protrude outward from the peripheral surface of the door base portion 265.

The second rotary door 26 has a seal portions 267a, 267b, 267c, 267d, 267e that are fixed by being attached to each of the flanges 266a, 266b, 266c, 266d. The five seal portions 267a, 267b, 267c, 267d, 267e have a rectangular shape in cross section and are made of a material having elasticity such as urethane foam resin.

Figure 10:
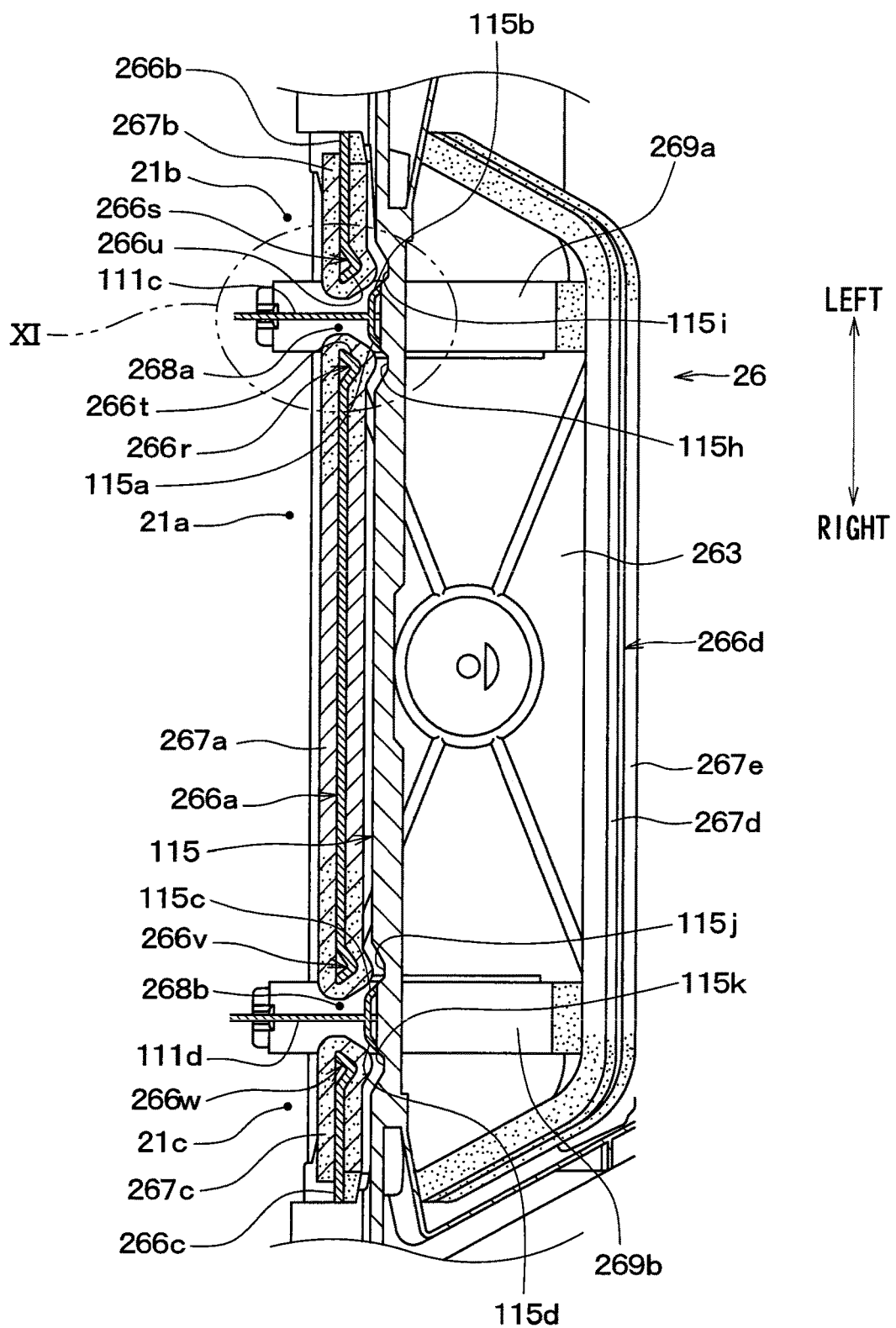
FIG. 10 is a cross-sectional view taken along a line X-X shown in FIG. 1.

The door base portion 265, the flanges 266a, 266b, 266c, 266d, and the seal portions 267a, 267b, 267c, 267d, 267e as a whole has a shape that is symmetry with respect to the door axial direction DRax. Accordingly, the third flange 266c, in addition to the second flange 266b, corresponds to a second flange of the present disclosure, and the third seal portion 267c, in addition to the second seal portion 267b, corresponds to a second seal portion of the present embodiment. Referring to FIG. 10, a third pressing surface 115c, in addition to a first pressing surface 115a, corresponds to a first pressing surface of the present disclosure, and a fourth pressing surface 115d, in addition to a second pressing surface 115b, corresponds to a second pressing surface of the present disclosure.

As shown in FIG. 4 and FIG. 5, the first flange 266a, the second flange 266b, and the third flange 266c are arranged in a periphery of the door base portion 265 on a rear side (refer to FIG. 1) in the door circumferential direction DRcr. The flanges 266a, 266b, 266c are arranged one after another in the door axial direction DRax in the periphery. Specifically, the first flange 266a is located at a center in the door axial direction DRax. The second flange 266b is located on one side of the first flange 266a in the door axial direction DRax, specifically, on a left side of the first flange 266a. The third flange 266c is located on the other side of the first flange 266a in the door axial direction DRax, specifically, on a right side of the first flange 266a.

By such an arrangement, the first flange 266a extends in the door axial direction DRax in a periphery of the outer door portion 263 in the door circumferential direction DRcr. The second flange 266b extends in the door axial direction DRax in the periphery of the outer door portion 263 to wrap the side plate 262a on an outer side in the door axial direction DRax. The third flange 266c extends in the door axial direction DRax in the periphery of the outer door portion 263 to wrap the side plate 262b on an outer side in the door axial direction DRax.

As shown in FIG. 7, the first flange 266a and the second flange 266b are distanced from each other in the door axial direction DRax, and a first insertion groove 268a is formed between the first flange 266a and the second flange 266b. Similarly, the first flange 266a and the third flange 266c are distanced from each other in the door axial direction DRax, and a second insertion groove 268b is formed between the first flange 266a and the third flange 266c.

As shown in FIG. 4 and FIG. 5, the fourth flange 266d is arranged in a periphery of the door base portion 265 on a front side (refer to FIG. 1) in the door circumferential direction DRcr. The fourth flange 266d extends in the door axial direction DRax in the periphery of the outer door portion 263 in the door circumferential direction DRcr to wrap each of the side plates 262a, 262b on an outer side in the door axial direction DRax.

The first seal portion 267a is fixed by being attached to the first flange 266a as shown in FIG. 7. Specifically, the first seal portion 267a is attached to the first flange 266a to extend from one surface 266g to the other surface 266h of the first flange 266a through both the first insertion groove 268a and the second insertion groove 268b, so as to wrap the first flange 266a. In other words, the first seal portion 267a extends from the one surface 266g to the other surface 266h of the first flange 266a through both the first insertion groove 268a and the second insertion groove 268b and is attached to the first flange 266a. That is, the first seal portion 267a is attached to cover all circumferences of the first flange 266a.

The second seal portion 267b is fixed by being attached to the second flange 266b. Specifically, the second seal portion 267b is attached to the second flange 266b to extend from one surface 266i to the other surface 266j of the second flange 266b through both the first insertion groove 268a and the second insertion groove 268b, so as to wrap the second flange 266b. In other words, the second seal portion 267b extends from the one surface 266i to the other surface 266j of the second flange 266b through both the first insertion groove 268a and the second insertion groove 268b and is attached to the second flange 266b.

The second seal portion 267b is, on the one surface 266i of the second flange 266b, attached to wrap the side plate 262a on the outer side in the door axial direction DRax (refer to FIG. 4). The second seal portion 267b, on the other surface 266j of the second flange 266b, does not wrap the side plate 262a on the outer side in the door axial direction DRax (refer to FIG. 7). That is, the second seal portion 267b is not provided on the other surface 266j, on the outer side of the side plate 262a in the door axial direction DRax.

Similar to the second seal portion 267b, the third seal portion 267c is fixed by attaching to wrap both one surface 266k and the other surface 266m of the third flange 266c. Therefore, an air passage through which air flows through the side face outlets 21b, 21c is secured even when the second rotary door 26 is located at the defroster opening position (refer to FIG. 2), because the seal portion is not provided on the other surface 266j, 266m on the outer side of the side plate 262a, 262b in the door axial direction DRax.

The fourth seal portion 267d is fixed by being attached to an entirety of one surface 266n of the fourth flange 266d as shown in FIG. 4 and FIG. 5. The fifth seal portion 267e is fixed by being attached to an entirety of the other surface 266p of the fourth flange 266d. The one surface 266g, 266i, 266k, 266n of each of the flanges 266a, 266b, 266c, 266d is a flange surface that faces an inner side of the door base portion 265 in the door circumferential direction DRcr. The other surface 266h, 266j, 266m, 266p is a flange surface that faces an outer side of the door base portion 265 in the door circumferential direction DRcr.

As shown in FIG. 4 and FIG. 5, the second rotary door 26 further has a first partition seal portion 269a and a second partition seal portion 269b having elasticity, in addition to the seal portions 267a, 267b, 267c, 267d, 267e. The first partition seal portion 269a and the second partition seal portion 269b are respectively attached to seal attachment portions 263a, 263b (refer to FIG. 8) that are a seal fixing portion provided on an outer peripheral side of the outer door portion 263. That is, the partition seal portions 269a, 269b are fixed on the outer peripheral side of the outer door portion 263.

Specifically, the partition seal portions 269a, 269b are respectively attached to the seal attachment portions 263a, 263b of the outer door portion 263 to have a curved shape protruding outward in the door radial direction DRrd (refer to FIG. 4).

Figure 9:
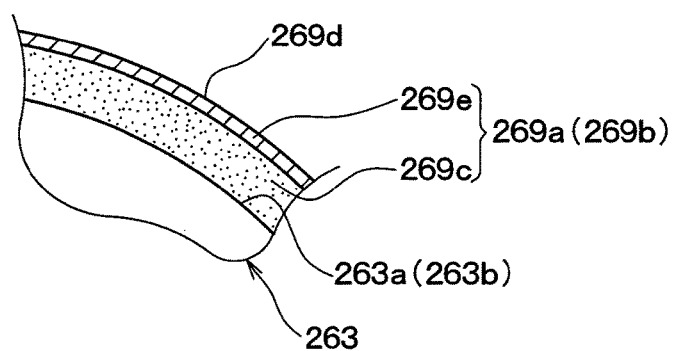
FIG. 9 is a detail view of a portion IX of FIG. 1.

The partition seal portions 269a, 269b are made of the same material to have the same shape. Specifically, the partition seal portions 269a, 269b are configured by an elastic base 269c, a resin film 269e, and an adhesive that is not shown, as shown in FIG. 9 that is a view illustrating a portion IX of FIG. 1 in detail. The elastic base 269c is made of a material such as urethane foam resin having elasticity. The resin film 269e forms a surface 269d of the partition seal portions 269a, 269b on an opposite side that is opposite from the seal attachment portions 263a, 263b. The adhesive is configured by, for example, a double-stick tape and arranged on a side adjacent to the seal attachment portions 263a, 263b. The elastic base 269c and the resin film 269e are stacked and attached to each other. The resin film 269e has the surface 269d that is made of a material such as polyethylene terephthalate or polycarbonate to be smoothly and easily bent.

The partitions 111a, 111b of the case 11 respectively has partition ribs 111c, 111d that protrude inward in the door radial direction DRrd (refer to FIG. 4) as shown in FIG. 8. The partition ribs 111c, 111d respectively have rib tip portions 111e, 111f that are located at an inner peripheral end of each of the partition ribs 111c, 111d in the door radial direction DRrd. The rib tip portions 111e, 111f extend in the door circumferential direction DRcr (refer to FIG. 5) as shown in FIG. 1.

As shown in FIG. 10, a left partition rib 111c of the two partition ribs 111c, 111d is inserted to the first insertion groove 268a of the second rotary door 26, and a right partition rib 111d is inserted to the second insertion groove 268b of the second rotary door 26. That is, the two insertion grooves 268a, 268b are provided to prevent the second rotary door 26 from interfering with the partition ribs 111c, 111d. FIG. 10 is a cross-sectional view taken along a line X-X of FIG. 1 and shows a cross section of the first flange 266a along the door circumferential direction DRcr. FIG. 1 illustrates the second rotary door 26 located at the defroster closing position. However, FIG. 10 illustrates the second rotary door 26 in a state where the second rotary door 26 slightly rotates from the defroster closing position toward the defroster opening position for an easy-to-read view.

As shown in FIG. 8, the first partition seal portion 269a of the second rotary door 26 is located between the seal attachment portion 263a of the outer door portion 263 and the partition rib 111c, and the second partition seal portion 269b is located between the seal attachment portion 263b of the outer door portion 263 and the partition rib 111d.

As shown in FIG. 1 and FIG. 2, an area in which the partition seal portions 269a, 269b are pressed against the rib tip portions 111e, 111f is provided within a whole length of the partition seal portions 269a, 269b in the door circumferential direction, and the area increases or decreases in conjunction with a rotation of the second rotary door 26. However, the partition seal portions 269a, 269b are not away from the rib tip portions 111e, 111f regardless of a location of the second rotary door 26 and respectively pressed against the rib tip portions 111e, 111f in the door radial direction DRrd. The partition seal portions 269a, 269b slide while respectively being in contact with the rib tip portions 111e, 111f in conjunction with the rotation of the second rotary door 26 around the door rotary shaft 261a, 261b.

As shown in FIG. 5, the partition seal portions 269a, 269b respectively have non-slidable portions 269f, 269g at one end in the circumferential direction DRcr on a rear side. The partition seal portions 269a, 269b are (i) bent such that the non-slidable portions 269f, 269g are distanced from the rib tip portions 111e, 111f (refer to FIG. 1) in the door radial direction DRrd (refer to FIG. 4) and (ii) attached to the seal attachment portions 263a, 263b. Accordingly, the non-slidable portions 269f, 269g of the partition seal portions 269a, 269b are kept away from the rib tip portions 111e, 111f in the door radial direction DRrd even when the second rotary door 26 rotates to any positions.

As shown in FIG. 5 and FIG. 7, the second rotary door 26 has stoppers 263c, 263d that extend from the outer door portion 263. The stoppers 263c, 263d are a stopper that prevents the non-slidable portions 269f, 269g from being distanced from the seal attachment portions 263a, 263b of the outer door portion 263. The stoppers 263c, 263d are located on an opposite side opposite to a side of the non-slidable portions 269f, 269g having an attachment surface 269h with respect to the non-slidable portions 269f, 269g. In other words, the non-slidable portions 269f, 269g are respectively located between the stoppers 263c, 263d and the attachment surface 269h. The stoppers 263c, 263d may be in contact with the non-slidable portions 269f, 269g, or may be slightly distanced from the non-slidable portions 269f, 269g as shown in FIG. 5. In a case where the non-slidable portions 269f, 269g removes from the outer door portion 263, an edge of the resin film 269e in the non-slidable portions 269f, 269g may slide while in contact with the rib tip portions 111e, 111f, and a sliding noise may increase. However, an increase of the sliding noise can be suppressed since the stoppers 263d, 263d restrict the removing of the non-slidable portions 269f, 269g.

The outer door portion 263 has protruding portions 263e, 263f protruding toward a side adjacent to the non-slidable portions 269f, 269g, in a portion of the seal attachment portions 263a, 263b to which the non-slidable portions 269f, 269g are attached. The protruding portions 263e, 263f locally hollow the non-slidable portions 269f, 269g from an inner side to an outer side in the door radial direction DRrd (refer to FIG. 4).

As shown in FIG. 1, the case 11 is provided with seal pressing portions 113, 114, 115, 116. The first seal portion 267a, the second seal portion 267b and the third seal portion 267c are pressed against the seal pressing portion 113, and the fourth seal portion 267d is pressed against the seal pressing portion 114, when the second rotary door 26 rotates to the defroster opening position (refer to FIG. 2).

Conversely, the first seal portion 267a, the second seal portion 267b and the third seal portion 267c are pressed against the seal pressing portion 115, and the fifth seal portion 267e is pressed against the seal pressing portion 116, when the second rotary door 26 rotates to the defroster closing position (refer to FIG. 1). Thereby, an air flow is restricted in a portion where each of the seal portions 267a, 267b, 267c, 267d, 267e is pressed against.

The seal pressing portion 115 of the four seal pressing portions 113, 114, 115, 116 is shown in FIG. 10. The seal pressing portion 115 is provided in a boundary area between the defroster opening 20 and the face opening 21 (refer to FIG. 1). As shown in FIG. 10, the first seal portion 267a, the second seal portion 267b and the third seal portion 267c are pressed against the seal pressing portion 115 in the door circumferential direction DRcr (refer to FIG. 5) from a side adjacent to the face opening 21 (refer to FIG. 1), when the second rotary door 26 rotates from the defroster opening position to the defroster closing position.

A pair of a first pressing surface 115a and a second pressing surface 115b is formed in a portion of the seal pressing portion 115 connecting to the left partition rib 111c, and a pair of the third pressing surface 115c and the fourth pressing surface 115d is formed in a portion of the seal pressing portion 115 connecting to the right partition rib 111d.

Figure 11:
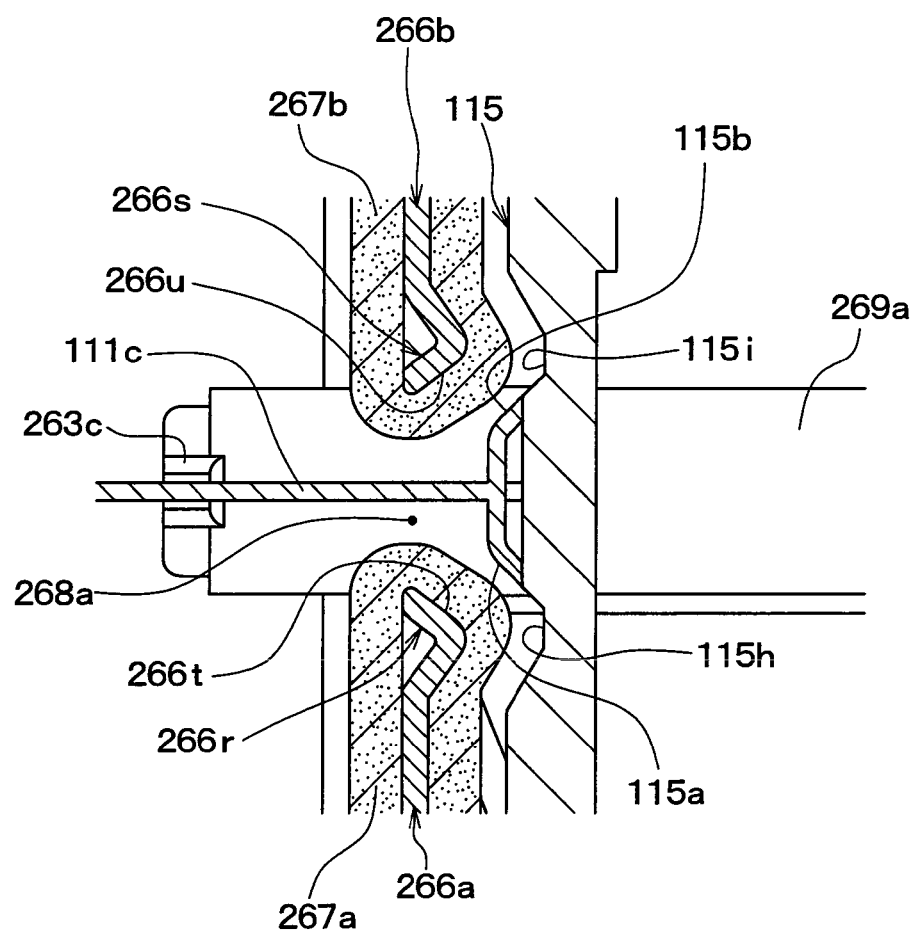
FIG. 11 is a detail view of a portion XI of FIG. 10.

An end portion 266r of the first flange 266a on a side adjacent to the first insertion groove 268a in the door axial direction DRax (refer to FIG. 4) is pressed against the first pressing surface 115a through the first seal portion 267a as shown in FIG. 11 that is a view illustrating a portion XI of FIG. 10 in detail. An end portion 266s of the second flange 266b on a side adjacent to the first insertion groove 268a is pressed against the second pressing surface 115b through the second seal portion 267b.

The first pressing surface 115a and the second pressing surface 115b incline with respect to the door circumferential direction DRcr and the door axial direction DRax and face a direction away from the partition rib 111c when viewed in the door radial direction DRrd as shown in FIG. 1. Specifically, the first pressing surface 115a and the second pressing surface 115b are arranged symmetrically while the partition rib 111c is interposing therebetween, when viewed in the door radial direction DRrd. In other words, the partition rib 111c is located between the first pressing surface 115a and the second pressing surface 115b, and the first pressing surface 115a and the second pressing surface 115b are arranged symmetrically, when viewed in the door radial direction DRrd.

Further, the end portion 266r of the first flange 266a has a first facing surface 266t that faces the first pressing surface 115a. The end portion 266s of the second flange 266b has a second facing surface 266u that faces the second pressing surface 115b.

The end portion 266r of the first flange 266a bulges in the door circumferential direction DRcr, in other words, in a thickness direction. Similarly, the end portion 266s of the second flange 266b bulges in the door circumferential direction DRcr. Specifically, the first flange 266a locally bulges toward a side adjacent to the seal pressing portion 115 in the end portion 266r, and the second flange 266b also locally bulges toward a side adjacent to the seal pressing portion 115 in the end portion 266s.

The seal pressing portion 115 is provided with recessed portions 115h, 115i that respectively fit the bulge of the end portions 266r, 266s. Specifically, according to the recessed portion 115h corresponding to the end portion 266r of the first flange 266a, the first seal portion 267a is not pressed strong locally in the end portion 266r between the first flange 266a and the seal pressing portion 115, and an entirety of the first seal portion 267a is pressed evenly. Similarly, according to the recessed portion 115i corresponding to the end portion 266s of the second flange 266b, the second seal portion 267b is not pressed strong locally in the end portion 266s between the second flange 266b and the seal pressing portion 115, and an entirety of the second seal portion 267b is pressed evenly.

Similar as described above, an end portion 266v of the first flange 266a on a side adjacent to the second insertion groove 268b is pressed against the third pressing surface 115c through the first seal portion 267a as shown in FIG. 10. An end portion 266w of the third flange 266c on a side adjacent to the second insertion groove 268b is pressed against the fourth pressing surface 115d through the third seal portion 267c. The third and fourth pressing surfaces 115c, 115d are similar to the first and second pressing surfaces 115a, 115b, thereby omitting the detailed description. A shape of each end portions 266v, 266w facing each other while the second insertion groove 268b is interposing therebetween is similar to the shape of each of the end portions 266r, 266s facing each other while the first insertion groove 268a is interposing therebetween. A shape of recessed portions 115j, 115k of the seal pressing portion 115 formed to fit the end portions 266v, 266w is similar to the shape of the recessed portions 115h, 115i, thereby omitting the detailed description.

The first and second rotary doors 25, 26 are operated in conjunction with each other by a common blowing mode door operational mechanism (not shown). Specifically, rotary shafts of the first and second rotary doors 25, 26 connects to the blowing mode door operational mechanism through a link mechanism that is not shown outside of the side walls of the case 11 in the left-right direction. An actuator mechanism using a motor is generally used as the blowing mode door operational mechanism, however a manual operational mechanism may be used, not the actuator mechanism.

An operation of the air conditioning unit 10 will be described next. FIG. 1 is the view illustrating the air conditioning unit 10 in the face mode. In the face mode, as shown in FIG. 1, the first rotary door 25 is located at the foot closing position, and the second rotary door 26 is located at the defroster closing position. Accordingly, the defroster opening 20 and the foot opening 22 are closed, on the other hand the opening degrees of the center face outlet 21a and the side face outlets 21b, 21c become maximum. Air from the air mixing portion 19 is mainly blown into the vehicle compartment from the center face outlet 21a and the side face outlets 21b, 21c.

FIG. 2 is the view illustrating the air conditioning unit 10 in the foot mode. In the foot mode, as shown in FIG. 2, the first rotary door 25 is located at the foot opening position, and the second rotary door 26 is located at the defroster opening position. Accordingly, the center face outlet 21a is closed, and opening degrees of the side face outlets 21b, 21c become minimum. Thus, air from the air mixing portion 19 is mainly blown into the vehicle compartment from the foot opening 22, and the rest of the air in a small amount is blown into the vehicle compartment from the side face outlets 21b, 21c and the defroster opening 20.

Blowing mode of the air conditioning unit 10 is set to, for example, a bi-level mode, a foot-defroster mode or a defroster mode, other than the above-described face mode or the foot mode. In the bi-level mode of the air conditioning unit 10, the first rotary door 25 is located at the middle position between the foot closing position and the foot opening position, and the second rotary door 26 is located at the defroster closing position. Accordingly, the conditioned air is blown from the center face outlet 21a, the side face outlets 21b, 21c, and the foot opening 22.

In the foot-defroster mode, the first rotary door 25 is located at the middle position, and the second rotary door 26 is located at the defroster opening position. Accordingly, the conditioned air is blown from the defroster opening 20, the side face outlets 21b, 21c, and the foot opening 22.

In the defroster mode, the first rotary door 25 is located at the foot closing position, and the second rotary door 26 is located at the defroster opening position. Accordingly, the conditioned air is mainly blown from the defroster opening 20, and a small amount of the conditioned air is blown from the side face outlets 21b, 21c.

As described above, according to the present embodiment, the second rotary door 26 has the first partition seal portion 269a and the second partition seal portion 269b that are fixed on the outer peripheral side of the outer door portion 263. The partition seal portions 269a, 269b are respectively located between the outer door portion 263 and the partition ribs 111c, 111d. The partition seal portions 269a, 269b are respectively pressed against the rib tip portions 111e, 111f in the door radial direction DRrd and move slidably with respect to the rib tip portions 111e, 111f in conjunction with a rotation of the second rotary door 26 around the door rotary shafts 261a, 261b.

Therefore, the first partition seal portion 269a can prevent air from flowing from the left side face outlet 21b to the center face outlet 21a when the second rotary door 26 is located at the defroster opening position. Furthermore, the second partition seal portion 269b can seal to certainly prevent air from flowing from the right side face outlet 21c to the center face outlet 21a. As a result, the first and second partition seal portion 269a, 269b and the fourth seal portion 267d can certainly prevent air from being blown from the center face outlet 21a when the second rotary door 26 is located at the defroster opening position.

Moreover, the partition ribs 111c, 111d are a rib that is protrudes inward from each of the partitions 111a, 111b in the door radial direction DRrd. Accordingly, a width of the partition ribs 111c, 111d is smaller than a width of gaskets 30, 31 that are respectively attached to surfaces of the partitions 111a, 111b, in a front view of the face opening 21 as shown in FIG. 3. That is, any one of the face outlets 21a, 21b, 21c does not interpose the partition ribs 111c, 111d. Therefore, the center face outlet 21a can be prevented from narrowing in the door axial direction DRax due to a sealing configuration between the center face outlet 21a and the side face outlets 21b, 21c. For example, an amount of air blown from the center face outlet 21a can be easily larger as compared to a case where a rotary door of an air conditioning unit described in Patent Literature 1 in which a width of a center face outlet in a door axial direction becomes small due to a sealing configuration.

According to the present embodiment, the second rotary door 26 has the stoppers 263c, 263d to prevent the non-slidable portions 269f, 269g of the first partition seal portion 269a and the second partition seal portion 269b from being separated from the seal attachment portions 263a, 263b of the outer door portion 263. Therefore, the partition seal portions 269a, 269b can be bent and attached to the seal attachment portions 263a, 263b while securing a durability of the first partition seal portion 269a and the second partition seal portion 269b.

According to the present embodiment, the protruding portions 263e, 263f provided with the outer door portion 263 locally hollow the non-slidable portions 269f, 269g of the first partition seal portion 269a and the second partition seal portion 269b from the inner side to the outer side in the door radial direction DRrd. Therefore, the partition seal portions 269a, 269b can be attached easily to the seal attachment portions 263a, 263b of the outer door portion 263 while being preventing a thickness of slidable portions of the partition seal portions 269a, 269b that slides with respect to the rib tip portions 111e, 111f becomes uneven, as compared to a structure that does not have the protruding portions 263e, 263f. For example, the partition seal portions 269a, 269b can be attached such that the slidable portions have an even thickness by repelling force of the protruding portions 263e, 263f even when a resin film having stiffness is used as the resin film 269e, and when a curvature radius of an attachment surface of the seal attachment portions 263a, 263b is small.

According to the present embodiment, the first pressing surface 115a and the second pressing surface 115b of the seal pressing portion 115 face the direction that is away from the partition rib 111c and inclines with respect to the door circumferential direction DRcr and the door axial direction DRax when viewed in the door radial direction as shown in FIG. 11. The end portion 266r of the first flange 266a on the side adjacent to the first insertion groove 268a in the door axial direction DRax is pressed against the first pressing surface 115a through the first seal portion 267a. The end portion 266s of the second flange 266b on the side adjacent to the first insertion groove 268a is pressed against the second pressing surface 115b through the second seal portion 267b.

Accordingly, a component of a pressing force affecting the first pressing surface 115a in the door axial direction DRax and a component of a pressing force affecting the second pressing surface 115b in the door axial direction DRax are balanced. The first flange 266a and the second flange 266b are pushed in the door circumferential direction DRcr by a driving force that rotates the second rotary door 26. On the other hand, an affecting direction of the pressing force inclines with respect to an affecting direction of the driving force, in other words, the door circumferential direction DRcr.

Accordingly, the seal portions 267a, 267b are compressed while being slightly sliding on the pressing surfaces 115a, 115b that incline with respect to a direction in which the seal portions 267a, 267b move, in a course of pressing the seal portions 267a, 267b against the pressing surfaces 115a, 115b respectively. Therefore, a repelling force against a rotational force rotating the second rotary door 26 can vary gradually as compared to a configuration in which the pressing surfaces 115a, 115b are perpendicular to the door circumferential direction DRcr. Thus, an operational feeling of the second rotary door 26 can be secured, for example, in a case where the second rotary door 26 is operated by the manual operational mechanism. In addition, durability of the seal portions 267a, 267b can be improved since a load applied to the seal portions 267a, 267b in being pressed against the pressing surfaces 115a, 115b is reduced.

According to the present embodiment, as shown in FIG. 11, the end portion 266r of the first flange 266a has the first facing surface 266t that faces the first pressing surface 115a, and the end portion 266s of the second flange 266b has the second facing surface 266u that faces the second pressing surface 115b. Therefore, a deterioration of durability of the first and second seal portions 267a, 267b can be suppressed since the first and second seal portions 267a, 267b are respectively pressed against the first and second pressing surfaces 115a, 115b. In addition, the first facing surface 266t and the second facing surface 266u promote an effect provided by inclining the pressing surfaces 115a, 115b. Therefore, durability of the first and second seal portions 267a, 267b can be improved.

According to the present embodiment, as shown in FIG. 10, the first seal portion 267a is attached to the first flange 266a to extend from the one surface 266g to the other surface 266h of the first flange 266a through both the first insertion groove 268a and the second insertion groove 268b, so as to wrap the first flange 266a. The end portions 266r, 266v of the first flange 266a bulge in the door circumferential direction DRcr in the first flange 266a. Accordingly, a curvature radius of the first seal portion 267a in the end portions 266r, 266v becomes large when the first seal portion 267a is attached to U-turn from the one surface 266g to other surface 266h as compared to a configuration in which the end portions 266r, 266v do not bulge. Therefore, a uniformity of a thickness of the first seal portion 267a around the end portions 266r, 266v can be easily secured. As a result, a sealing property of the first seal portion 267a around the end portions 266r, 266v can be easily secured. This is the same about the second seal portion 267b and the third seal portion 267c.

According to the present embodiment, the seal pressing portion 115 is provided with the recessed portions 115h, 115j that fit the bulge of the end portions 266r, 266v of the first flange 266a. Therefore, the first seal portion 267a as a whole can be compressed at an even compression rate between the seal pressing portion 115 and the first flange 266a, and the sealing property can be secured evenly. This is the same about the second seal portion 267b and the third seal portion 267c.

According to the present embodiment, the first pressing surface 115a and the second pressing surface 115b are arranged symmetrically while the partition rib 111c is interposing therebetween, when viewed in the door radial direction DRrd. Therefore, an absolute value of a difference between the component of the pressing force that is applied to the first pressing surface 115a in the door axial direction DRax and the component of the pressing force that is applied to the second pressing surface 115b in the door axial direction DRax can be small as compared to a configuration in which the first pressing surface 115a and the second pressing surface 115b are not symmetry. That is, an effect of pressing the second rotary door 26 in the door axial direction DRax by the two pressing forces can be small since the two components in the door axial direction DRax are opposite to each other.

According to the present embodiment, the first partition seal portion 267a and the second partition seal portion 269b have resin film 269e forming the surface 269d on the side sliding while being in contact with the partition ribs 111c, 111d. Therefore, the partition ribs 111c and 111d can be slide smoothly, and, for example, a sliding noise and sliding resistance can be small.

According to the present embodiment, as shown in FIG. 1, the partition ribs 111c, 111d of the partition 111a are located on the outer side of the outer door portion 263 of the second rotary door 26 in the door radial direction DRrd and do not extend to an inside of the outer door portion 263 in the door radial direction DRrd. Accordingly, a ventilation resistance of air flowing from the air mixing portion 19 to the face outlets 21a, 21b, 21c can be kept small when the second rotary door 26 is located at the defroster closing position.

According to the present embodiment, the fourth flange 266d and the fifth seal portion 267e of the second rotary door 26 are portions exerting a sealing function in the defroster opening 20. A width of the fourth flange 266d and the fifth seal portion 267e in the door axial direction DRax is larger than a width of the center face outlet 21a. That is, the width of the fourth flange 266d and the fifth seal portion 267e is not limited to be smaller than the width of the center face outlet 21a, and the width of the defroster opening 20, which is sealed by the fourth flange 266d and the fifth seal portion 267e, in the door axial direction DRax can easily become larger. As a result, an amount of air being blown from the defroster opening 20 can easily be secured to be large.

Second Embodiment

A second embodiment of the present disclosure will be described. In the present embodiment, features different from the first embodiment will be described mainly, and a description of a part that corresponds to or equivalents to a matter described in the first embodiment may be omitted or simplified.

Figure 12:
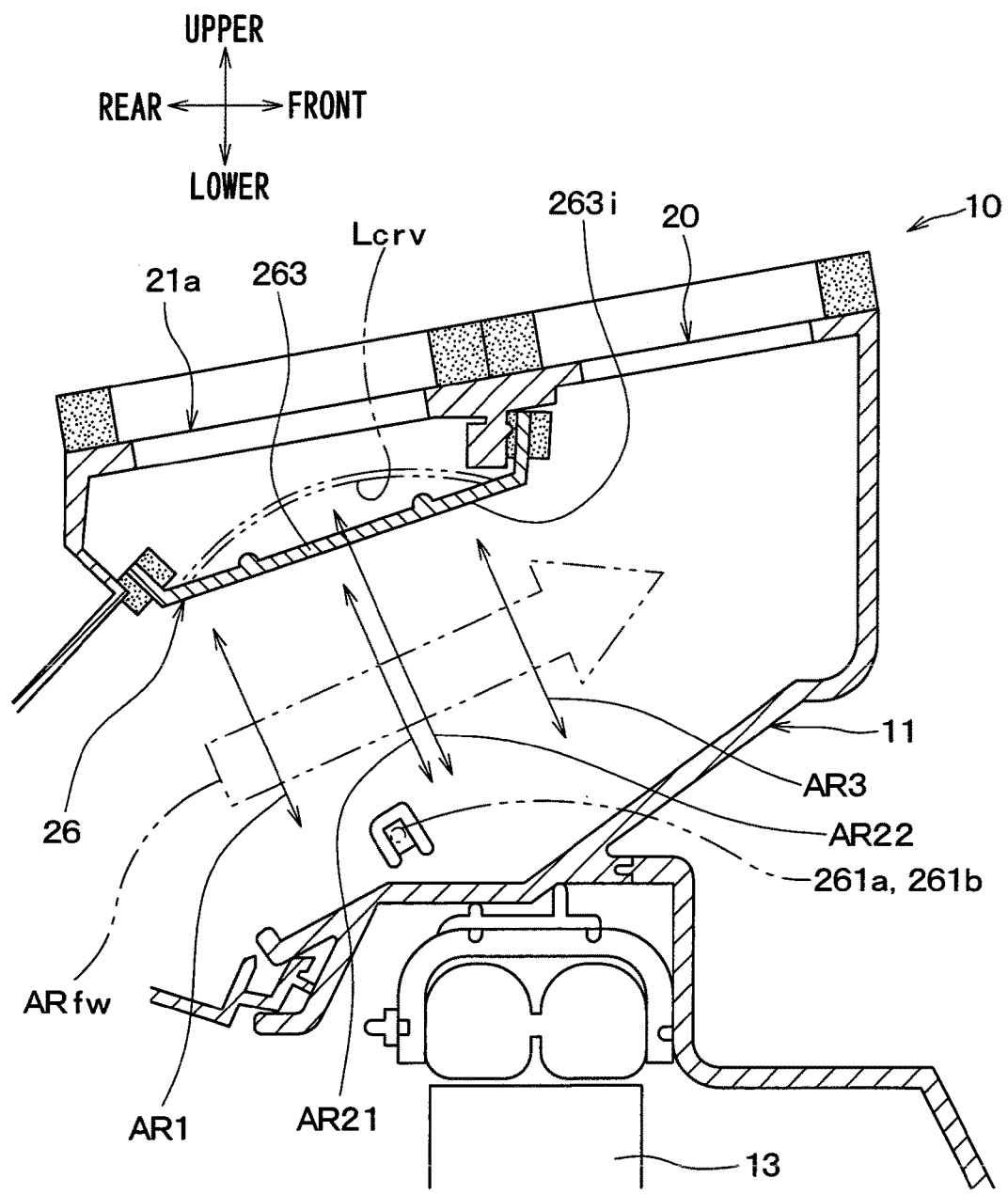
FIG. 12 is a view illustrating a configuration of a second embodiment and is a cross-sectional view taken along a line XII-XII shown in FIG. 3 in a defroster mode.
Figure 13:
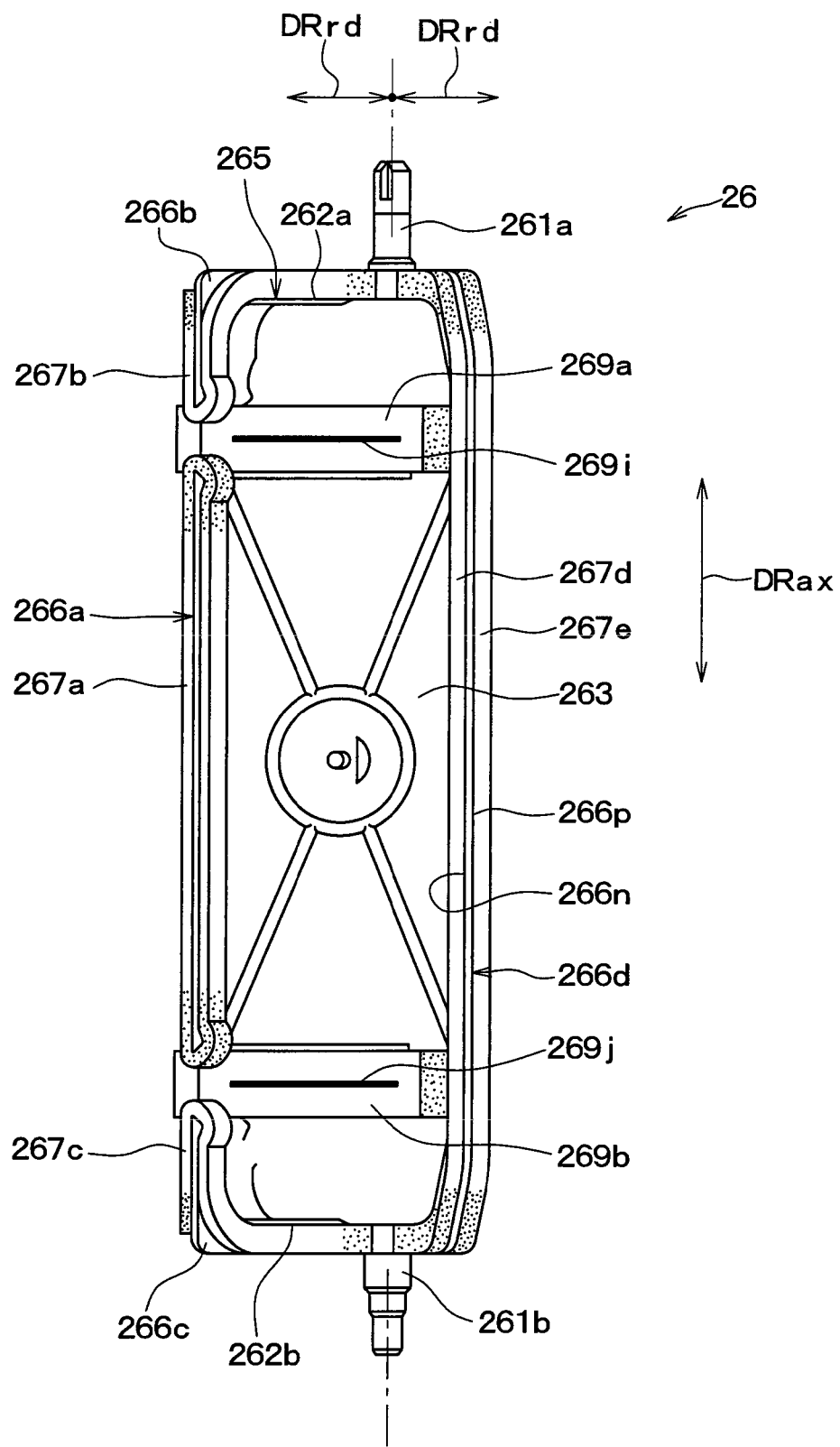
FIG. 13 is a view corresponding to FIG. 4 and a view illustrating a first modification example of the embodiments.

Aspects of the present embodiment are shown in FIG. 12. FIG. 13 is a cross-sectional view taken along a line XII-XII of FIG. 3 and illustrating the air conditioning unit 10 in the defroster mode. As shown in FIG. 12, the outer door portion 263 has an inward surface 263i that is formed on a side adjacent to the door rotary shaft 261a, 261b of the outer door portion 263, in other words, on an inner side of the outer door portion 263 in the door radial direction DRrd. The inward surface 263i is configured to be planar, not to be curved as shown by a two-dot chain line Lcrv.

According to the present embodiment, a width variation of a ventilation passage in which air flows to the defroster opening 20 along the inward surface 263i (refer to an arrow ARfw) can be restricted as shown by arrows AR1, AR21, AR3 when the second rotary door 26 is located at the defroster opening position, since the inward surface 263i of the outer door portion 263 is configured to be planar. On the other hand, the width variation of the ventilation passage becomes larger as shown by arrows AR1, AR22, AR3 when the inward surface 263i is curbed as shown by the two-dot chain line Lcrv.

Therefore, according to the present embodiment, ventilation resistance in the ventilation passage can be small as compared to a configuration in which the inward surface 263i of the outer door portion 263 is curved. As a result, an amount of air can be increased easily in a case where the air flows on a side adjacent to the inward surface 263i of the outer door portion 263 as shown by the arrow ARfw such as a case where the air flows from the communication passage 27 (refer to FIG. 1) to the defroster opening 20 in the defroster mode.

Other Modifications (1) In the above-described embodiments, the first partition seal portion 269a and the second partition seal portion 269b have a resin film 269e (refer to FIG. 9). However, as shown in FIG. 13, a slits 269i, 269j that extends in a sliding direction of the partition ribs 111c, 111d, in other words, in the door circumferential direction DRcr may be provided in a portion of the resin film 269e in which the partition ribs 111c, 111d slide while being in contact with the portion. FIG. 13 corresponds to FIG. 4 and a view illustrating a first modification example of the above-described embodiments.

By providing the slits 269i, 269j as shown in FIG. 13, the partition seal portions 269a, 269b, especially the resin film 269e therein deform easily due to the pressing force of the partition ribs 111c, 111d. Accordingly, a sliding resistance of the partition ribs 111c, 111d can be decreased. The slits 269i, 269j shown in FIG. 13 are formed by cutting the surface 269d of the partition seal portions 269a, 269b. The slits 269i, 269j may or may not pass through the partition seal portions 269a, 269b. In addition, the slits 269i, 269j may pass through only the resin film 269e, or may extend to the elastic base 269c through the resin film 269e. Further, the slits 269i, 269j may be formed by cutting the partition seal portions 269a, 269b from a side adjacent to the elastic base 269c not to pass through the resin film 269e.

(2) According to the above-described embodiments, the first partition seal portion 269a and the second partition seal portion 269b are respectively attached to the seal attachment portions 263a, 263b of the outer door portion 263 as shown in FIG. 8. However, a shape of the seal attachment portions 263a, 263b may be different from the shape shown in FIG. 8. For example, the shape may be one shown in FIG. 14 that is a view illustrating a portion corresponding to a portion XIV of FIG. 8 regarding a second modification example of the above-described embodiments.

Figure 14:
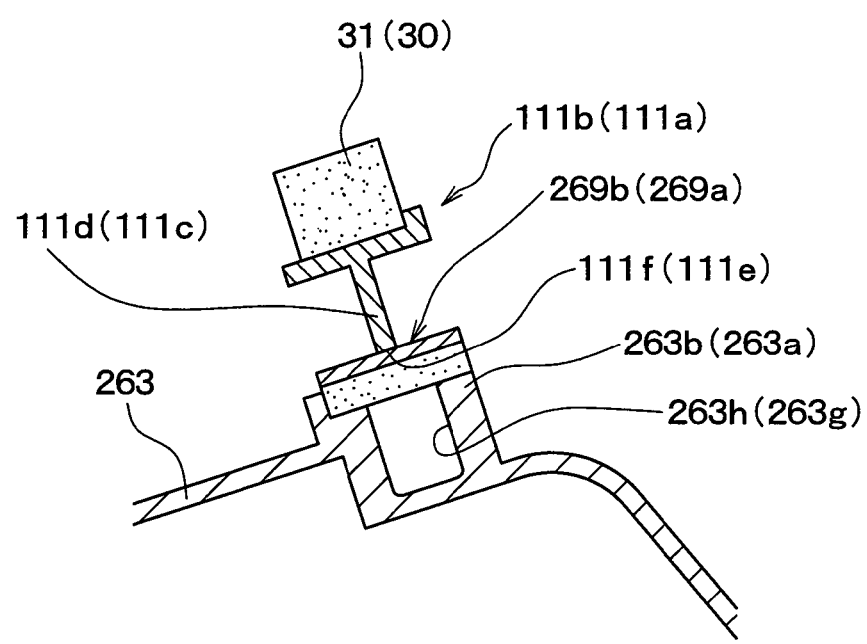
FIG. 14 is a view illustrating a second modification example of the embodiments and a view illustrating a portion corresponding to XIV shown in FIG. 8.

In the modification example of FIG. 14, a groove 263g extending in the sliding direction of the partition rib 111c is provided in a portion of the seal attachment portion 263a that faces the rib tip portion 111e in the door radial direction DRrd with having the first partition seal portion 269a interposing therebetween. Similarly, a groove 263h extending in the sliding direction of the partition rib 111d is provided in a portion of the seal attachment portion 263b that faces the rib tip portion 111f in the door radial direction DRrd with having the second partition seal portion 269b interposing therebetween. Accordingly, the partition seal portions 269a, 269b, especially the resin film 269e therein becomes easier to be deformed by the pressing force of the partition ribs 111c, 111d. Therefore, the sliding resistance of the partition ribs 111c, 111d can be reduced. Here, FIG. 14 is a view illustrating around the second partition seal portion 269b in detail, and reference numbers of the first partition seal portion 269a and elements associate with the first partition seal portion 269a are shown with brackets.

Figure 15:
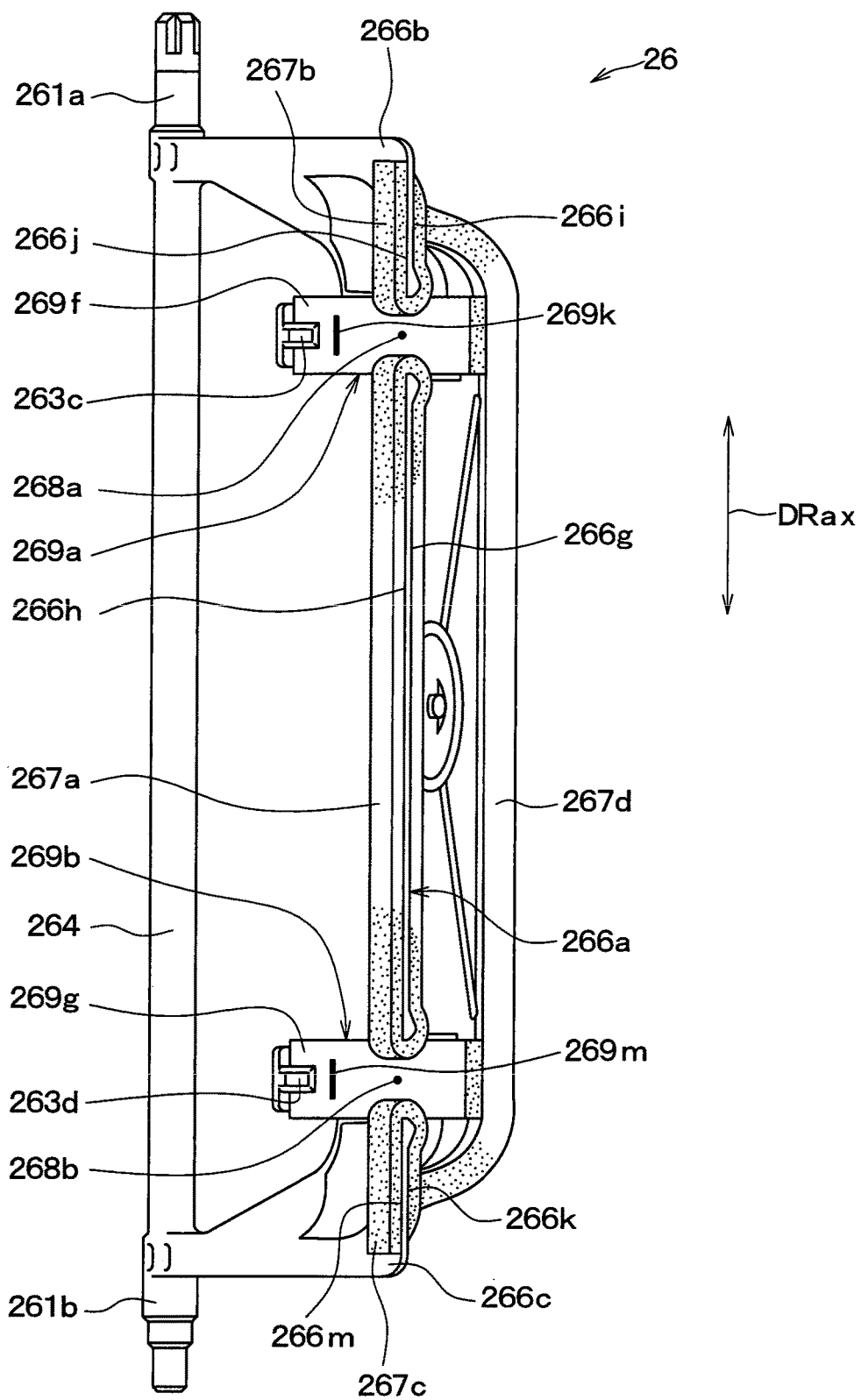
FIG. 15 is a view corresponding to FIG. 7 and a view illustrating a third modification example of the embodiments.

(3) According to the above-described embodiments, the partition seal portions 269a, 269b respectively have the non-slidable portions 269f, 269g. As shown in FIG. 15, the non-slidable portions 269f, 269g may be provided with a breaking portions 269k, 269m in which the resin film 269e (refer to FIG. 9) is broken locally. FIG. 15 is a view corresponding to FIG. 7 and a view illustrating a third modification example of the above-described embodiments. The breaking portions 269k, 269m has a slit shape, however a shape of the breaking portions 269k, 269m is not limited. The breaking portions 269k, 269m are only required to be formed in the resin film 269e. For example, the breaking portions 269k, 269m may pass through only the resin film 269e, or may pass through the resin film 269e and the elastic base 269c.

(4) According to the above-described embodiments, the face opening 21 has two side face outlets 21b, 21c. However, one side face outlet 21c may be omitted depending on a ventilation piping to the vehicle compartment.

(5) According to the above-described embodiments, the sealing configuration by the first partition seal portion 269a and the second partition seal portion 269b is used in the second rotary door 26. However, the seal configuration is not limited to be used in the second rotary door 26.

(6) According to the above-described second embodiment, the inward surface 263i of the outer door portion 263 of the second rotary door 26 is configured planar. However, such a configuration of the outer door portion 263 is not limited to the second rotary door 26, and the first rotary door 25 may have the similar configuration.

(7) According to the above-described embodiments, the evaporator 13 and the heater core 15 are arranged longitudinally. However, the evaporator 13 and the heater core 15 may be arranged to face any direction depending on an airflow in the case 11.

(8) According to the above-described embodiments, the air mix door 14 is a slide door. However, the air mix door 14 may be another type of door such as a plate door that rotates around a shaft.

(9) According to the above-described embodiments, for example, warm air after passing through the heater core 15 is guided by the warm-air guide wall 11d and flows upward in the warm air passage 18. However, a flow direction of air flowing to each opening is not limited.

(10) According to the above-described embodiments, the side plates 262a, 262b has a shape shown in FIG. 5. However, the shape of the side plates 262a, 262b is not limited to such a shape.

The present disclosure is not limited to the above-described embodiments and can be modified within the scope of the present disclosure as defined by the appended claims. In the above-described embodiments, it is to be understood that elements constituting the embodiments are not necessary except for a case of being explicitly specified to be necessary and a case of being considered to be absolutely necessary in principle. Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle. Even when a feature such as a material forming a member, a shape of a member, a positional relation of members, it is to be understood that such feature is not limited to a specific material, shape, positional relation, or the like except for a case of being explicitly specified to be necessary and a case of being considered to be absolutely necessary in principle.

The invention claimed is:

1. An air conditioning unit comprising:
   a rotary door that has a door rotary shaft and an outer door portion rotating integrally with the door rotary shaft at a position a specified distance away outward from a center of the door rotary shaft in a radial direction;
   a case that houses the rotary door;
   a first opening that (i) is located in the case on an outer side of the outer door portion in the radial direction of the door rotary shaft, (ii) is open or closed by the rotary door, and (iii) blows air;
   a partition that is provided in the case and partitions the first opening to form a first air outlet and a second air outlet arranged in an axial direction of the door rotary shaft; and
   an air passage that is formed in the case, the air passage in which air flows toward the first opening, wherein
   the partition has a partition rib that protrudes inward in the radial direction,
   the partition rib has a rib tip portion that extends in a circumferential direction of the door rotary shaft,
   the rotary door has a partition seal portion that (i) is fixed to the outer door portion on an outer side of the outer door portion, (ii) has elasticity, and (iii) is located between the outer door portion and the partition rib,
   the partition seal portion is pressed against the rib tip portion in the radial direction and moves slidably with respect to the rib tip portion in conjunction with a rotation of the rotary door around the door rotary shaft,
   the case has:
      a second opening that is located adjacent to the first opening in the circumferential direction and flows air; and
      a seal pressing portion that is provided in a boundary area between the first opening and the second opening,
   the rotary door has:
      a first flange and a second flange that are formed in a peripheral portion of the outer door portion in the circumferential direction;
      a first seal portion that is fixed to the first flange and has elasticity; and
      a second seal portion that is fixed to the second flange and has elasticity,
   the rotary door rotates to be located at (i) a first rotary position where the rotary door opens the first air outlet and closes the second opening and (ii) a second rotary position where the rotary door closes the first air outlet and opens the second opening,
   the first flange and the second flange:
      extend in the axial direction and are arranged adjacent to each other in the axial direction; and
      form an insertion groove, to which the partition rib is inserted, between the first flange and the second flange,
   the first seal portion and the second seal portion are pressed against the seal pressing portion from a side adjacent to the first opening in the circumferential direction when the rotary door rotates from the second rotary position to the first rotary position,
   the seal pressing portion has:
      a first pressing surface against which an end portion of the first flange on a side adjacent to the insertion groove in the axial direction is pressed through the first seal portion; and
      a second pressing surface against which an end portion of the second flange on a side adjacent to the insertion groove is pressed through the second seal portion, and
   the first pressing surface and the second pressing surface incline with respect to the circumferential direction and face a direction away from the partition rib, when viewed in the radial direction.

2. The air conditioning unit according to claim 1, wherein the partition seal portion is attached to the outer door portion and has a curved shape protruding outward in the radial direction,
   the partition seal portion has a non-slidable portion at an end in the circumferential direction,
   the non-slidable portion is kept away from the rib tip portion in the radial direction even when the rotary door rotates,
   the rotary door has a stopper that extends from the outer door portion and prevents the non-slidable portion from being separated from the outer door portion, and
   the non-slidable portion is located between the stopper and an attachment surface of the non-slidable portion that is attached to the outer door portion.

3. The air conditioning unit according to claim 2, wherein the outer door portion has a protruding portion that hollows the non-slidable portion locally.

4. The air conditioning unit according to claim 1, wherein the first seal portion extends from one surface to an other surface of the first flange through the insertion groove and is attached to the first flange.

5. The air conditioning unit according to claim 4, wherein the end portion of the first flange bulges in the circumferential direction in the first flange.

6. The air conditioning unit according to claim 5, wherein the end portion of the first flange bulges in the circumferential direction toward the seal pressing portion, and
   the seal pressing portion is provided with a recessed portion that fits the bulge of the end portion of the first flange.

7. The air conditioning unit according to claim 1, wherein the second seal portion extends from one surface to an other surface of the second flange through the insertion groove and is attached to the second flange.

8. The air conditioning unit according to claim 7, wherein the end portion of the second flange bulges in the circumferential direction in the second flange.

9. The air conditioning unit according to claim 8, wherein
the end portion of the second flange bulges in the circumferential direction toward the seal pressing portion, and
the seal pressing portion is provided with a recessed portion that fits the bulge of the end portion of the second flange.

10. The air conditioning unit according to claim 1, wherein
the first pressing surface and the second pressing surface are arranged symmetric with having the partition rib therebetween, when viewed in the radial direction.

11. The air conditioning unit according to claim 1, wherein
the end portion of the first flange has a first facing surface that faces the first pressing surface, and
the end portion of the second flange has a second facing surface that faces the second pressing surface.

12. The air conditioning unit according to claim 1, wherein
the partition seal portion has a resin film that forms a surface on a side sliding while being in contact with the partition rib.

13. The air conditioning unit according to claim 12, wherein
the resin film is made of polyethylene terephthalate or polycarbonate.

14. The air conditioning unit according to claim 12, wherein
a slit that extends in a sliding direction of the partition rib is provided in a portion of the resin film in which the partition rib slides while being in contact with the portion.

15. The air conditioning unit according to claim 12, wherein
the outer door portion has a seal fixing portion to which the partition seal portion is fixed, and
the seal fixing portion has a portion that faces the rib tip portion in the radial direction with having the partition seal portion therebetween, and a groove extending in a sliding direction of the partition rib is provided in the portion of the seal fixing portion.

16. The air conditioning unit according to claim 12, wherein
the partition seal portion:
is attached to the outer door portion and has a curved shape protruding outward in the radial direction; and
has a non-slidable portion at an end in the circumferential direction, and the non-slidable portion keeps the partition seal portion away from the rib tip portion in the radial direction even when the rotary door rotates, and
the non-slidable portion is provided with a breaking portion in which the resin film breaks locally.

17. The air conditioning unit according to claim 1, wherein
the outer door portion has an inward surface that is formed on an inner side of the outer door portion in the radial direction, and
the inward surface has a planar configuration.

18. An air conditioning unit comprising:
a rotary door that has a door rotary shaft and an outer door portion rotating integrally with the door rotary shaft at a position a specified distance away outward from a center of the door rotary shaft in a radial direction;
a case that houses the rotary door;
a first opening that (i) is located in the case on an outer side of the outer door portion in the radial direction of the door rotary shaft, (ii) is open or closed by the rotary door, and (iii) blows air;
a partition that is provided in the case and partitions the first opening to form a first air outlet and a second air outlet arranged in an axial direction of the door rotary shaft; and
an air passage that is formed in the case, the air passage in which air flows toward the first opening, wherein
the partition has a partition rib that protrudes inward in the radial direction,
the partition rib has a rib tip portion that extends in a circumferential direction of the door rotary shaft,
the rotary door has a partition seal portion that (i) is fixed to the outer door portion on an outer side of the outer door portion, (ii) has elasticity, and (iii) is located between the outer door portion and the partition rib,
the partition seal portion is pressed against the rib tip portion in the radial direction and moves slidably with respect to the rib tip portion in conjunction with a rotation of the rotary door around the door rotary shaft,
the partition seal portion is attached to the outer door portion and has a curved shape protruding outward in the radial direction,
the partition seal portion has a non-slidable portion at an end in the circumferential direction,
the non-slidable portion is kept away from the rib tip portion in the radial direction even when the rotary door rotates,
the rotary door has a stopper that extends from the outer door portion and prevents the non-slidable portion from being separated from the outer door portion,
the non-slidable portion is located between the stopper and an attachment surface of the non-slidable portion that is attached to the outer door portion,
the stopper is in contact with the non-slidable portion, the outer door portion has a protruding portion that hollows the non-slidable portion locally,
the case has:
a second opening that is located adjacent to the first opening in the circumferential direction and flows air; and
a seal pressing portion that is provided in a boundary area between the first opening and the second opening,
the rotary door has:
a first flange and a second flange that are formed in a peripheral portion of the outer door portion in the circumferential direction;
a first seal portion that is fixed to the first flange and has elasticity; and
a second seal portion that is fixed to the second flange and has elasticity,
the rotary door rotates to be located at (i) a first rotary position where the rotary door opens the first air outlet and closes the second opening and (ii) a second rotary position where the rotary door closes the first air outlet and opens the second opening,
the first flange and the second flange:
extend in the axial direction and are arranged adjacent to each other in the axial direction; and
form an insertion groove, to which the partition rib is inserted, between the first flange and the second flange,
the first seal portion and the second seal portion are pressed against the seal pressing portion from a side adjacent to the first opening in the circumferential direction when the rotary door rotates from the second rotary position to the first rotary position, the seal pressing portion has:
- a first pressing surface against which an end portion of the first flange on a side adjacent to the insertion groove in the axial direction is pressed through the first seal portion; and
- a second pressing surface against which an end portion of the second flange on a side adjacent to the insertion groove is pressed through the second seal portion, and the first pressing surface and the second pressing surface incline with respect to the circumferential direction and face a direction away from the partition rib, when viewed in the radial direction.

\* \* \* \* \*